(12) United States Patent
Crittenden

(10) Patent No.: US 10,060,182 B1
(45) Date of Patent: Aug. 28, 2018

(54) MARGIN AIR FLOW DOORS FOR PREVENTING PRESSURE BUILD UP

(71) Applicant: Jerry G. Crittenden, Phoenix, AZ (US)

(72) Inventor: Jerry G. Crittenden, Phoenix, AZ (US)

(*) Notice: Subject to any disclaimer, the term of this patent is extended or adjusted under 35 U.S.C. 154(b) by 0 days.

(21) Appl. No.: 15/732,192

(22) Filed: Sep. 30, 2017

Related U.S. Application Data

(60) Division of application No. 15/330,870, filed on Nov. 9, 2016, and a continuation-in-part of application No. 15/330,471, filed on Sep. 24, 2016, now Pat. No. 9,803,417, and a continuation-in-part of application No. 14/999,148, filed on Apr. 1, 2016, now Pat. No. 9,493,980, and a continuation-in-part of application No. 14/756,033, filed on Jul. 23, 2015, and a continuation-in-part of application No. 14/756,017, filed on Jul. 21, 2015, now Pat. No. 9,719,291, and a continuation-in-part of application No. 14/120,870, filed on Jul. 7, 2014, now Pat. No. 9,109,389, and a
(Continued)

(51) Int. Cl.
| | |
|---|---|
| E06B 5/12 | (2006.01) |
| B01D 53/14 | (2006.01) |
| F24F 13/28 | (2006.01) |
| F24F 13/12 | (2006.01) |
| E06B 7/02 | (2006.01) |
| F24F 11/72 | (2018.01) |
| F24F 11/70 | (2018.01) |
| E06B 3/70 | (2006.01) |
| F24F 11/35 | (2018.01) |

(52) U.S. Cl.
CPC ............ *E06B 5/12* (2013.01); *B01D 53/14* (2013.01); *E06B 3/7001* (2013.01); *E06B 7/02* (2013.01); *F24F 11/70* (2018.01); *F24F 11/72* (2018.01); *F24F 13/12* (2013.01); *F24F 13/28* (2013.01); *E06B 2003/7051* (2013.01); *E06B 2003/7094* (2013.01); *F24F 11/35* (2018.01)

(58) Field of Classification Search
None
See application file for complete search history.

(56) References Cited

U.S. PATENT DOCUMENTS

| | | | | |
|---|---|---|---|---|
| 1,107,369 A | * | 8/1914 | Shelton | E06B 3/5892 454/195 |
| 1,771,569 A | * | 7/1930 | Benoit | E06B 7/08 160/101 |

(Continued)

*Primary Examiner* — Steven B McAllister
*Assistant Examiner* — Frances F Hamilton
(74) *Attorney, Agent, or Firm* — H. Gordon Shields

(57) ABSTRACT

Doors having stile and rail frames and center elements secured to the stile and rail frames and the center elements have margins inwardly where the center elements and the door frames overlap and openings extend through the margins outwardly from openings in skins, and inside and outside skins are secured to the stile and rail frames. The inside and outside skins have openings adjacent to and laterally or inwardly spaced apart from the openings through the margins whereby air flows through the openings in the inside skin, through the openings in the margins, and through the openings in the outside skin in a non-linear manner to prevent pressure build up in rooms to comply with the Department of Energy maximum recommended room pressure of three pascals or less.

21 Claims, 13 Drawing Sheets

Related U.S. Application Data continuation-in-part of application No. 12/927,766, filed on Nov. 23, 2010, now Pat. No. 9,085,933.

(56) References Cited

U.S. PATENT DOCUMENTS

| | | | | |
|---|---|---|---|---|
| 1,939,312 | A * | 12/1933 | Murray | E06B 7/082 454/195 |
| 2,308,262 | A * | 1/1943 | Beil | F24F 13/18 454/195 |
| 2,328,761 | A * | 9/1943 | Wamnes | E06B 7/02 454/195 |
| 3,061,056 | A * | 10/1962 | Kodaras | E06B 5/20 181/290 |
| 3,094,058 | A * | 6/1963 | O'Brien, Jr. | E06B 7/10 160/89 |
| 3,122,984 | A * | 3/1964 | Rosenfeld | A62B 13/00 454/195 |
| 3,295,273 | A * | 1/1967 | Wehe, Jr. | E06B 3/822 181/292 |
| 3,963,094 | A * | 6/1976 | Nowikas | E04B 1/8218 181/198 |
| 5,119,593 | A * | 6/1992 | Bae | E06B 3/7005 49/501 |
| 5,155,936 | A * | 10/1992 | Johnson | E06B 7/06 160/222 |
| 7,275,352 | B2 * | 10/2007 | Autovino | E06B 3/72 52/232 |
| 8,336,672 | B2 * | 12/2012 | Derks | F16L 55/033 181/224 |
| 8,539,729 | B2 * | 9/2013 | Lynch | B27N 3/08 52/455 |
| 8,615,945 | B2 * | 12/2013 | Walker | E04C 2/34 428/105 |
| 9,534,385 | B2 * | 1/2017 | Burr | E04C 2/523 |
| 2005/0193655 | A1 * | 9/2005 | Paxton | E06B 3/5892 52/204.591 |
| 2005/0284030 | A1 * | 12/2005 | Autovino | E05B 65/104 52/1 |
| 2009/0133957 | A1 * | 5/2009 | Owens | E04F 17/04 181/224 |
| 2011/0175504 | A1 * | 7/2011 | Cook | H05K 7/20572 312/236 |
| 2011/0203585 | A1 * | 8/2011 | Cozean | A61M 16/06 128/203.12 |

* cited by examiner

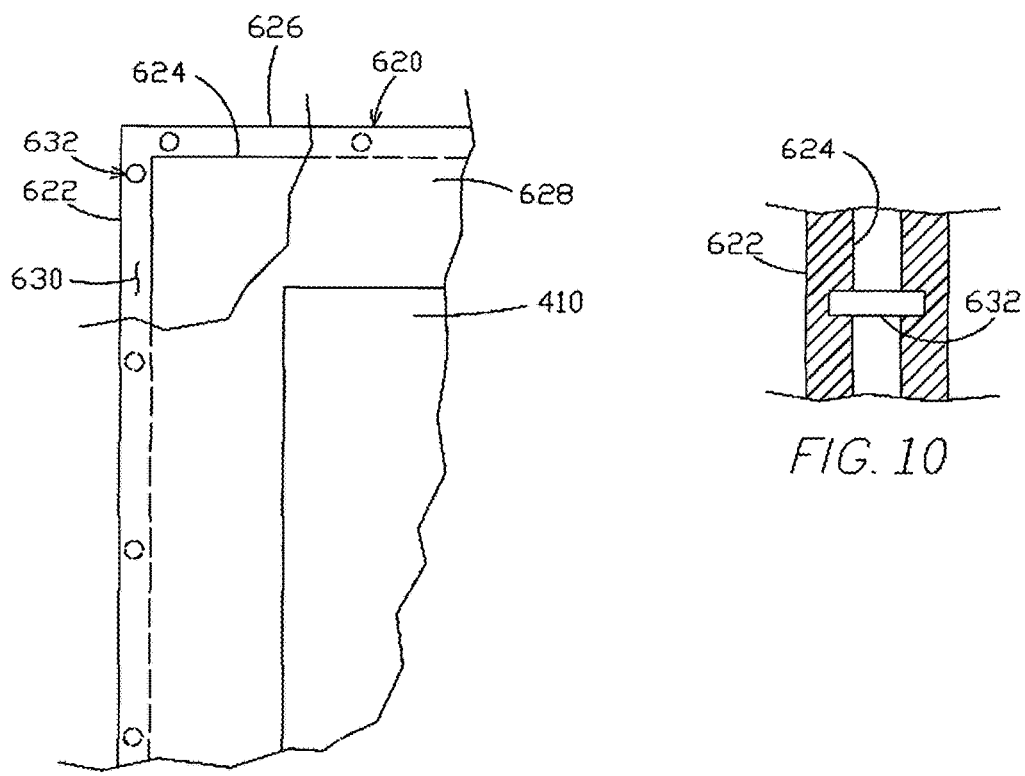
FIG. 9
FIG. 10
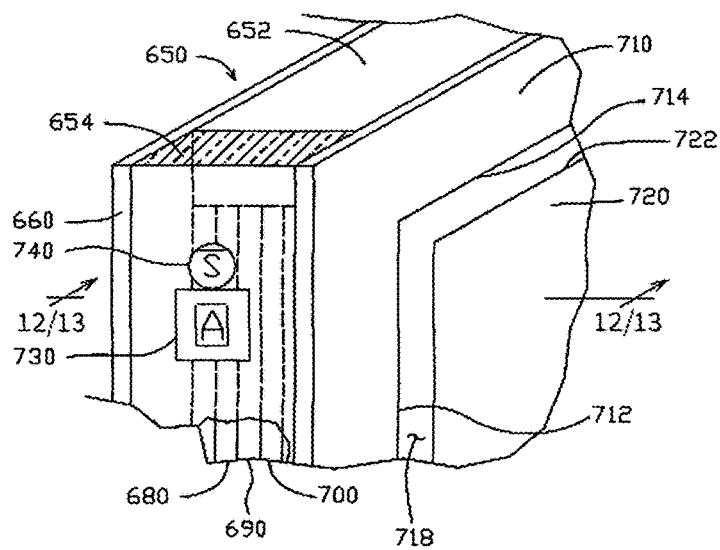
FIG. 11

MARGIN AIR FLOW DOORS FOR PREVENTING PRESSURE BUILD UP

CROSS REFERENCE TO RELATED APPLICATIONS

This application is a division of application Ser. No. 15/330,870, filed Nov. 9, 2016, which is a continuation in part application of application Ser. No. 15/330,471, filed Sep. 24, 2016, which was a continuation in part application of application Ser. No. 14/999,148, filed Apr. 1, 2016, now U.S. Pat. No. 9,493,980, dated Nov. 15, 2016, a continuation in part of application Ser. No. 14/756,033, filed Jul. 23, 2015, and application Ser. No. 14/756,017, filed Jul. 21, 2015, now U.S. Pat. No. 9,719,291, dated Aug. 1, 2017, which were continuation in part applications of application Ser. No. 14/120,870, filed Jul. 7, 2014, now U.S. Pat. No. 9,109,389, dated Aug. 18, 2015, and which was a continuation in part application of application Ser. No. 12/927,766, filed Nov. 23, 2010, now U.S. Pat. No. 9,085,933, dated Jul. 21, 2015.

STATEMENT REGARDING FEDERALLY SPONSORED RESEARCH OR DEVELOPMENT

Not Applicable

BACKGROUND OF THE INVENTION

Field of the Invention

This invention pertains to doors, and, more particularly, to doors having stile and rail frames and center panel elements and through which margin portions air flows in a non-linear manner for preventing the build up of air pressure a closed room.

Description of the Prior Art

Hollow core doors have been made for many years for inside doors. The hollow core doors are less expensive than solid core doors, are easier to manufacture, and they are generally rigid and hence resist warping and twisting. Such hollow core doors make up the largest share of inside doors where strength and security are not required.

A hollow core door includes a conventional perimeter frame having a pair of vertically extending stiles and a pair of horizontally extending rails. The perimeter frame is covered typically with plywood or other appropriate panels or skins secured to the perimeter frame. There are generally also inside frame elements, typically wood strips extending horizontally between vertical frame members or in an "x" configuration within the perimeter frame for reinforcing the skins.

With the advent of cheaper materials, such as hardboard and medium density fiberboard (mdf) to replace the plywood, the construction of doors became less expensive using the cheaper materials than the manufacture of doors using the more expensive plywood panels or skins. However, the use of hardboard and mdf also requires a binder, and the most commonly used binder is a urea formaldehyde resin or compound. In other words, the substances out of which panels for hollow core doors are made inherently include, under contemporary manufacturing processes, at least a single noxious material.

The use of urea formaldehyde contributes to what is sometimes referred to as "Sick Building Syndrome." This syndrome is caused by the gas emissions from the formaldehyde and from other chemicals used in the new door products and from other products in the home that also use formaldehyde resin or binder, such as furniture, kitchen cabinets, wood flooring, counter tops, wallpaper, carpet, and even paint.

There may also be other factors contributing to the Sick Building Syndrome, such as poor ventilation, combustion gases, fumes from attached garages, high auto traffic, tobacco smoke, and various volatile organic chemicals or VOCs. However, formaldehyde compounds or products probably contribute most to the Sick Building Syndrome and to the discomfort of people in the building or structure.

One solution, or partial solution, to the syndrome is to reduce the use of formaldehyde products. Another solution is to provide a product or products that absorbs and decomposes the formaldehyde gases and other noxious gases or products. The present invention includes absorbent material which absorbs and decomposes formaldehyde gases and other noxious materials and removes them from within the hollow core door and from air passing through the hollow core of a door to help clean the air within the room and building in which the door is located.

Moreover, the use of several doors in a house or building, such as one or more doors in each room, provides sufficient area on which is disposed the absorbent material for cleaning or scrubbing the air flowing through the doors. It is noted that typically each room in a house has at least one door, and rooms may have more than one door when closet doors, etc., are taken into consideration. The more doors in a home or building, the more efficient the scrubbing or cleaning process becomes.

It is also noted that in the case of new construction, doors are usually installed towards the end of the construction period, but prior to occupancy. It is important to clean the air of all the noxious material occasioned by the construction, such as paints, adhesives, smoking, new furniture, etc., prior to occupancy. The use of fans to change the air after construction and prior to occupancy may remove much of the noxious materials, but VOCs and adhesive gases may continue to outflow from their sources for a substantial period of time after construction and after occupancy. The present invention helps to remove those noxious materials from the air on a continuing, long term basis.

Hollow core doors also have an advantage in that the hollow core is ideal for including pressure equalization elements to prevent air pressure from building up within a closed room. Air pressure building up in a closed room interferes with the proper circulation of heated or cooled air in a forced air system.

The use of thinner skins in hollow core doors typically requires that the skins be molded for strength. A benefit of the molded skins is decorative. That is, the molds are generally decorative to simulate wood. The thinner skins also require or need interior bracing of some type. Openings in the skins at the margins, or adjacent to where the skins and the stiles and rails are aligned, allow air to flow through the door. Outer skins or baffle panels cover the openings to provide a non-linear path through the door for sight, sound, and light reduction or limiting purposes.

Stile and rail doors have a stile and rail frame and a center panel is secured to the frame. Typically, the stiles, rails, and the center panel are made of wood. Such stile and rail doors may also be used to prevent pressure build up in a closed room.

Modifications to both hollow core and stile and rail doors may be made to prevent pressure build up, whether the source of the pressure is from a forced air system or from ordinary wind through open windows.

Typically, there are no cost effective ways in the prior art to prevent the increase in pressure in a closed room relative to a return air space. The return air space in a house is usually a hall which has a return air duct which conveys return air back to an air handler.

Several embodiments of hollow core doors and stile and rail doors of the present invention overcome the problem of preventing pressure build up in a room and at the same time provide substantial privacy relative to both light, sight, and sound. Moreover, the air scrubbing and pressure build up structures may be combined to provide a "smart door" that performs both a scrubbing function and a pressure build up prevention function.

SUMMARY

The invention described and claimed herein comprises doors having air flow, both hollow core doors with stiles and rails defining a frame and openings through the outer margin of the hollow core door and openings through the margin of the center panel and the stile and rail frames. Both types of doors have outer frames or skins defining baffles for directing air flow into and through the openings at the margins of the hollow core door and the stile and rail door and through the door in a non-linear manner. The air flow through the doors has at least five changes of direction to provide the non-linear flow of air through the door to prevent a build up of pressure in a room to which a door is secured. The flow of air through the openings at the margins is greater than the area of an inflow so that there is no build up of pressure in the room. For a simple definition, the "margins" of the doors are adjacent to where the center elements of the doors meet the stile and rail frames. This definition will be discussed in detail below.

Among the objects of the present invention are the following:

To provide a new and useful hollow core door;

To provide a new and useful hollow core door having skins secured to a stile and rail frame;

To provide a new and useful stile and rail door;

To provide a new and useful hollow core door having openings at the margins of the hollow core and the stiles and rails;

To provide a new an useful stile and rail door having openings at the margins of the stiles and rails and a center panel;

To provide a new and useful door having air flow through the margins of the door of a predetermined amount equal to or greater than the air flow into the room to prevent the build up of pressure in the room;

To provide a new and useful door having a stile and rail frame and center elements secured to the stile and rail frame and having openings at the margins of the center elements and the stile and rail frame and a cover element secured to the stile and rail frame to provide an air flow through the margin openings in the door in a non-linear manner to prevent pressure build up in a closed room;

To provide a new and useful hollow core door having openings in the margins of the skins and outer skins having openings adjacent to the margin openings through which a flow of air moves through the door in a non-linear manner;

To provide a new and useful hollow core door for preventing a build up of pressure in a room by air flowing non-linearly about a center panel through the door;

To provide a new and useful hollow core door having center elements with openings at the margins of the center elements through which air flows and outer skins having an opening adjacent to the openings at the margins for directing the flow of air through the door in a non-linear manner;

To provide a new and useful door combining an air flow through the door for removing noxious materials from the air flow and for preventing a pressure build up in a room by flowing air generally non-linearly through the door to a return air space;

To provide new and useful apparatus for preventing a build up of pressure in a closed room having a forced air system;

To provide a new and useful stile and rail door having a center element secured to the stiles and rails and openings at the margins of the stiles and rails and the center element through which openings air flows and a cover element through which air flows; and To provide a new and useful stile and rail door having a center panel with openings at the margins of the stiles and rails and the center panel and skins secured to the stiles and rails having openings adjacent to the openings at the margins for providing non-linear movement in a flow of air through the door.

BRIEF DESCRIPTION OF THE DRAWING

FIG. 9 is a fragmentary view, partially broken away, of a portion of an alternate embodiment door 620 of the present invention.

FIG. 10 is a fragmentary edge view of a portion of the door 620 of FIG. 9.

FIG. 11 is a perspective view partially broken away schematically illustrating an alternate hollow core door embodiment 650 of the present invention.

DESCRIPTION OF THE PREFERRED EMBODIMENT

Figure 1:
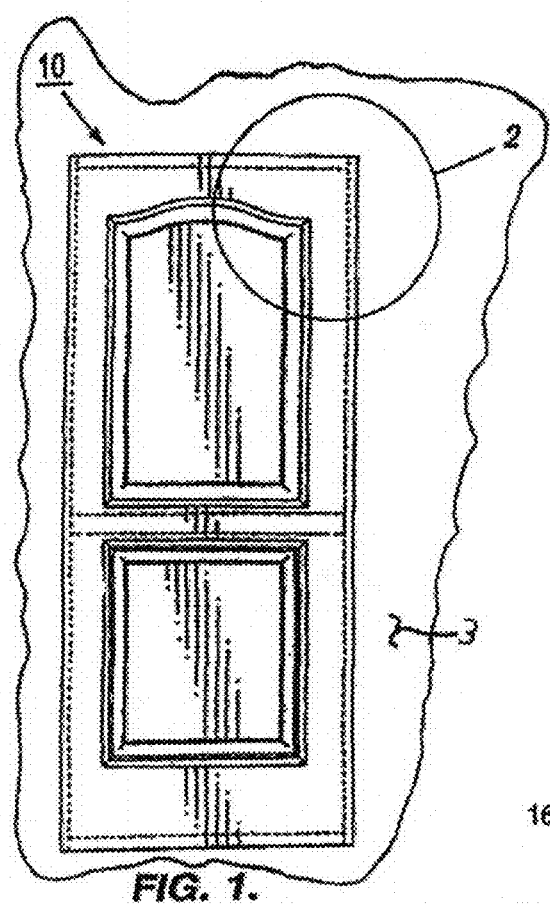
FIG. 1 is a schematic representation of a door of the present invention in its use environment.

Only the pertinent drawing figures of the parent applications of the present invention are included herein. Except for FIGS. 1-6, the figure numbers have been changed from the original applications, but the reference numerals for the original figures have been retained for convenience.

Figure 2:
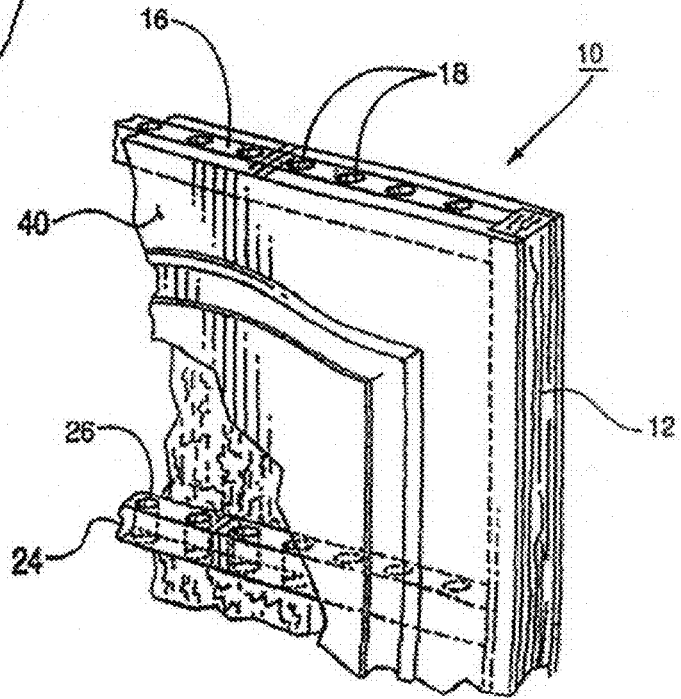
FIG. 2 is a perspective view of a portion of the door of FIG. 1 partially broken away, taken generally from circle 2 of FIG. 1.

FIG. 1 is a schematic representation of a view of a conventionally framed hollow core door 10 of the present invention disposed in a room 3. The room 3 is the use environment of the door 10. The door 10 includes a top panel or skin 12 (see FIG. 2) secured to a perimeter frame Elements of the perimeter frame and portions of internal elements are shown in FIG. 2. FIG. 2 comprises a perspective view of a portion of the door 10 of FIG. 1, taken generally from circle 2 of FIG. 1. A portion of a side stile 12 is shown, along with a portion of a top rail 16, and a top panel or skin 40. The top rail 16 includes a plurality of openings or holes 18 through which air flows vertically within the door 10. Also shown in FIG. 2 is a portion of an upper internal brace element 24. The element 24 includes a plurality of spaced apart holes or openings 26 through which air may flow.

Figure 3:
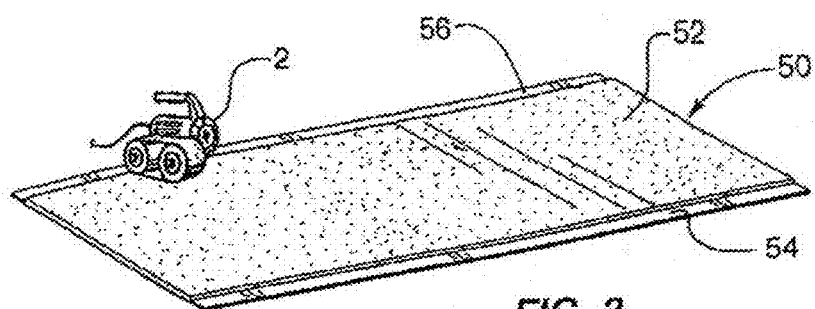
FIGS. 3, 4, and 5 are perspective views sequentially illustrating the manufacture of a door of the present invention.
Figure 4:
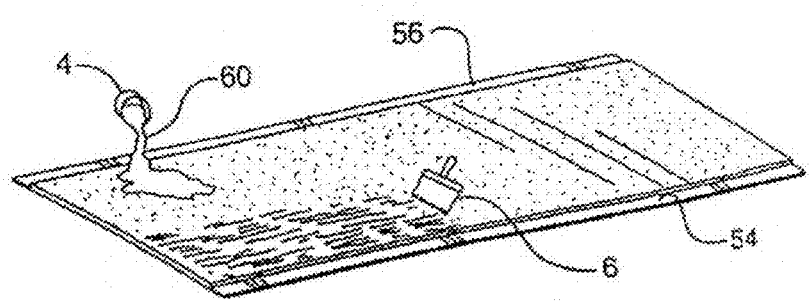
Figure 5:
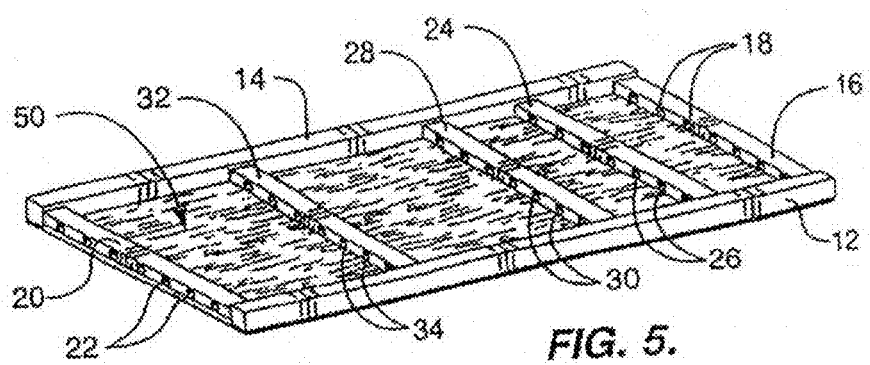
Figure 6:
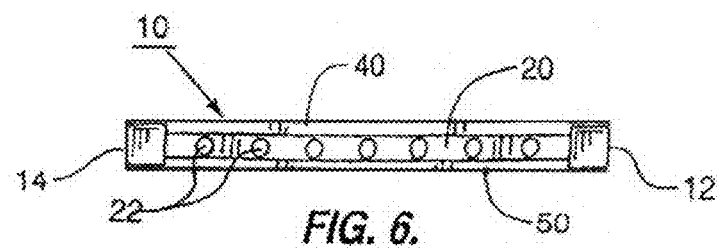
FIG. 6 is an end view of a hollow core door of the present invention.

The door 10 and a method of making the door is illustrated in FIGS. 3, 4, and 5. FIGS. 3, 4, and 5 are consecutive or sequential perspective views illustrating the steps used to make the door 10. FIG. 5 also illustrates the internal bracing of the door 10. FIG. 6 is an end view of the completed door 10. For the following discussion, reference will be primarily directed to FIGS. 3, 4, 5, and 6.

A central portion 52 of an outer door panel or skin 50 may be rough sanded by a belt sander 2 after parallel rabbets 54 and 56 are machined into the panel 50. Obviously, an automatic sanding machine, not shown, may be preferable to the hand operated belt sander 2 shown in FIG. 3 if such sanding is deemed desirable. The purpose of the sanding is to acquire better adhesion of absorbent material to the panels of the door. Other methods may also be used, such as paint or other adhesive.

The stiles 12 and 14 extend into the rabbets 54 and 56, as best shown in FIG. 6, when the outer panels are ready to be secured to the perimeter frame and to any internal frame elements.

After the rough sanding or sealing of the panel, an absorbent, such as diatomaceous earth, is applied to the rough sanded portion 52 of the panel 50. In FIG. 4, the absorbent material is schematically represented by reference numeral 60 being applied from a can or cup 4 or other desired element to form a layer on the sanded portion 52 of the panel 50.

It will also be noted that paper impregnated with an absorbent material may also be adhesively secured to the panel portion 52. Paper strips are sometimes adhesively secured to the inside portions of the outer panels or skins to provide stiffness. The strips may be impregnated with an absorbent, as noted.

The layer 60 is a special absorbent material which also may include an appropriate binder to secure the adhesion of the absorbent material to the panel 50. A water based paint may be used if desired. A scraper or trowel 6 is shown in FIG. 4 as smoothing the layer of absorbent material 60 on the panel 50 to insure an even coating on the panel.

It will be noted that any appropriate method of applying the absorbent material may be used. For example, rollering, spraying, troweling, etc., may be desired under various circumstances, such as when automating the process, or when a particular type of absorbent material used, etc.

Absorbent materials, such as diatomaceous earth and other materials which may also contribute to the absorption and decomposition of formaldehyde and noxious material may be includes in the absorbent material layer 60. A benefit of using diatomaceous earth, in addition to its absorbent capability, is the destruction of noxious insects. It is well known that insects which eat diatomaceous earth die of dehydration. Thus, the absorbent material layer 60 provides a pest control service or function, in addition to the absorption and decomposition of formaldehyde gases and tobacco smoke ingredients, and other noxious gases.

Other materials such as gypsum, sodium sulfate, manganese dioxide, aluminum oxide, titanium dioxide, potassium permanganate, tourmaline, various types of carbon or charcoal, and other materials currently being used or being developed may also be included or used as or in the absorbent material layer 60.

Furthermore, the use of nano scale materials may also be used to scrub noxious materials, such as volatile organic chemicals (VOCs), from air. Nano scale materials, such as the tourmaline referred to in the preceding paragraph, are being developed for scrubbing noxious materials from air, but at the present time the use of such technology is in it infancy. In the future, such materials may be advantageous for use with the structure set forth herein.

The steps illustrated in FIGS. 3 and 4 are accomplished on the inner surfaces of both panels or skins 40 and 50. Sequentially, after both panels have received the absorbent or scrubber material, the panels are secured to the perimeter frame and to the internal bracing or core. For example, in FIG. 5 the bottom panel 50 is shown secured to the stiles 12 and 14 and to the rails 16 and 20. Both rails 16 and 20 include the holes or apertures 18 and 22, respectively. Internal horizontal bracing or core elements 24, 28, and 32 are secured to the panel 50 and to the stiles 12 and 14. The elements 24, 28, and 32 each have a plurality of holes or apertures 26, 30, and 34, respectively, to allow for the flow or air continuing through the core of the door 10.

FIG. 6, an end view of the door 10, shows the stiles 12 and 14 and the bottom rail 20 with its apertures 22, and the panels or skins 40 and 50. Note that the panels or skins 40 and 50 have been arbitrarily been designated "top" and "bottom" for convenience. The "top" panel 40 or skin is also designated as the "front" panel, above, and following the nomenclature of the parent applications except for the ultimate parent application, the '933 patent, comprises the inside skin.

Moreover, if absorbent and decomposing materials, such as diatomaceous earth and gypsum, etc., are incorporated into the construction of the mdf or similar material, then such materials need not be added to the inside of the panels themselves. Rather, the addition of the scrubbing materials to the mdf or similar material in the making of the panels simplifies the scrubbing situation.

However, the inclusion of the scrubbing materials into the panels may not be sufficient if the filtering or scrubbing of an air flow through a hollow core door is desired. In such case, the addition of scrubbing material or materials within the hollow core as described above is desirable.

While diatomaceous earth and other materials have been mentioned or discussed above as appropriate absorbent materials for formaldehyde and other noxious material in the gases in the air flowing through the hollow core of a door, there are other appropriate absorbent or decomposing materials, such as activated carbon or charcoal, with appropriate additives, and other materials which also may be used for absorbing and decomposing formaldehyde and other noxious gases in the air flowing through the internal core of the hollow doors discussed above. And in the future there will undoubtedly be other materials to perform the same basic scrubbing functions.

Moreover, one panel or skin, a top panel or skin for example, may use one type of absorbent or decomposing material, while the other panel or skin, a bottom panel or skin, may use another type of absorbent or decomposing material. Or several types of such materials may be used on each panel or skin. The use of a particular one or more materials may depend on the particular situations or locations for or at which the doors are made or are installed. The removal of noxious materials from air flowing through the hollow core of a door may include different types of absorbent or decomposing or other products. Noxious material may take the form of compounds, odors, moisture, etc., and combinations of such things.

The removal of such noxious material may require absorption, decomposition, or other technique—chemical, mechanical, etc. The flow of air in a structure and through the hollow core of a door carries the noxious material, and the removal of the noxious material may require a combination of products, techniques, etc.

Another technique may also be used to remove noxious materials, and that technique is to use a photocatalyst, such as titanium dioxide. A photocatalyst, such as titanium dioxide reacts to light, such as ultra violet light, and breaks down into hydroxyl radicals and super oxide anions. The products of the photocatalytic process oxidize noxious materials, such volatile organic compounds, formaldehyde, and other materials as referred to above, etc.

Ambient light, direct sunlight, or an artificial light source, may be used to provide the necessary light to catalyze the photocatalytic material. The photocatalytic process will continue as long as there is light to cause the photocatalytic process to take place.

Accordingly, referring to FIG. 1, the exterior of the door, or the door facings, may be coated with titanium dioxide or other photocatalytic compound. In the presence of light, sunlight or ambient light, the photocatalytic process takes place, removing noxious products or materials.

It will be noted that the term "gases" is to be broadly construed and includes water vapor or moisture in the air, as well as odoriferous gases, and other noxious materials or compounds in the air within a structure. The term "gases" is thus not limited to formaldehyde or similar gases.

It will also be noted that doors made out of mdf products have been discussed and illustrated because of the use of formaldehyde resin or binders commonly used in the manufacture of mdf products, and formaldehyde is probably the leading noxious material. However, a hollow core door made of steel, fiberglass, wood, or other products, may also be used with absorbent, decomposing, etc., material within the hollow core for removing or neutralizing noxious material or products or gases from air flowing through the hollow core. The scrubbing of noxious material from air flow accordingly may require a combination of materials secured within the hollow core of a door regardless of what the door is made of.

The terms "scrubber," "scrubbers," and "scrubbing," all refer generically to the various kinds or types of material which may be used to remove noxious materials from the internal air flow within the core of a door.

It will further be noted that as used herein, and in the following claims, the terms "material" and "materials" are virtually interchangeable, with "material" being considered both, or either, singular or plural.

The terms "absorb" and "absorbent," etc., have been used herein regarding appropriate materials for carrying out the purposes of the present invention. It will be understood that "adsorb" and "adsorbent" materials may also be used to carry out the purposes of the present invention. Essentially, for purposes herein, the terms are interchangeable. Moreover, it will be understood that a combination of absorbent and adsorbent materials may be used if desired in the cleaning or filtering of the air flow through the hollow core doors of the present invention.

In addition to the removal of noxious material from an air flow through hollow core door, a hollow core door may be used to prevent the build up of air pressure in a closed room which has a forced air system. Embodiments of such hollow core door apparatus are illustrated in drawing FIGS. 7-18 are discussed below. An embodiment of a stile and rail door is illustrated in FIG. 19 and is also discussed below.

Figure 7:
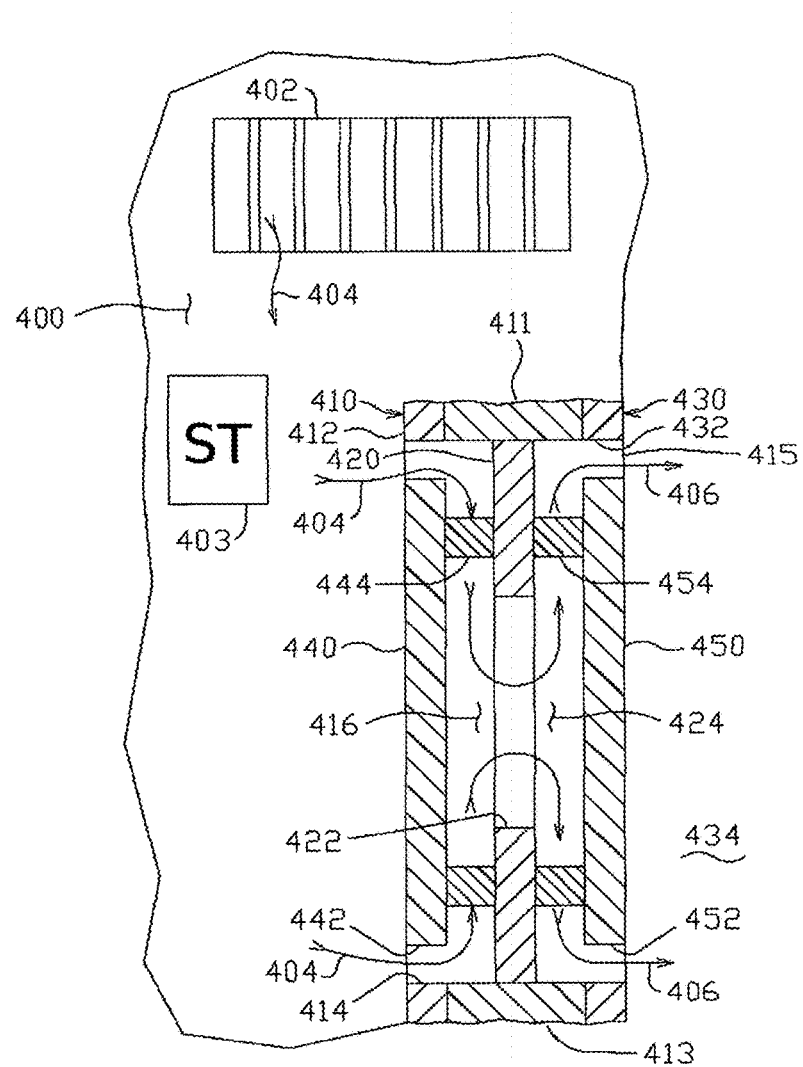
FIG. 7 is a schematic representation, including a view in partial section of an alternate embodiment of a portion of a door 410 of the present invention illustrating core elements, in the use environment of the present invention.

FIG. 7 is a schematic view in partial section of a portion of a door 410 illustrating the concept of the present invention in an embodiment for preventing the build up of air pressure from a flow of air 404 flowing from a register 402 in a closed room 404.

Figure 8:
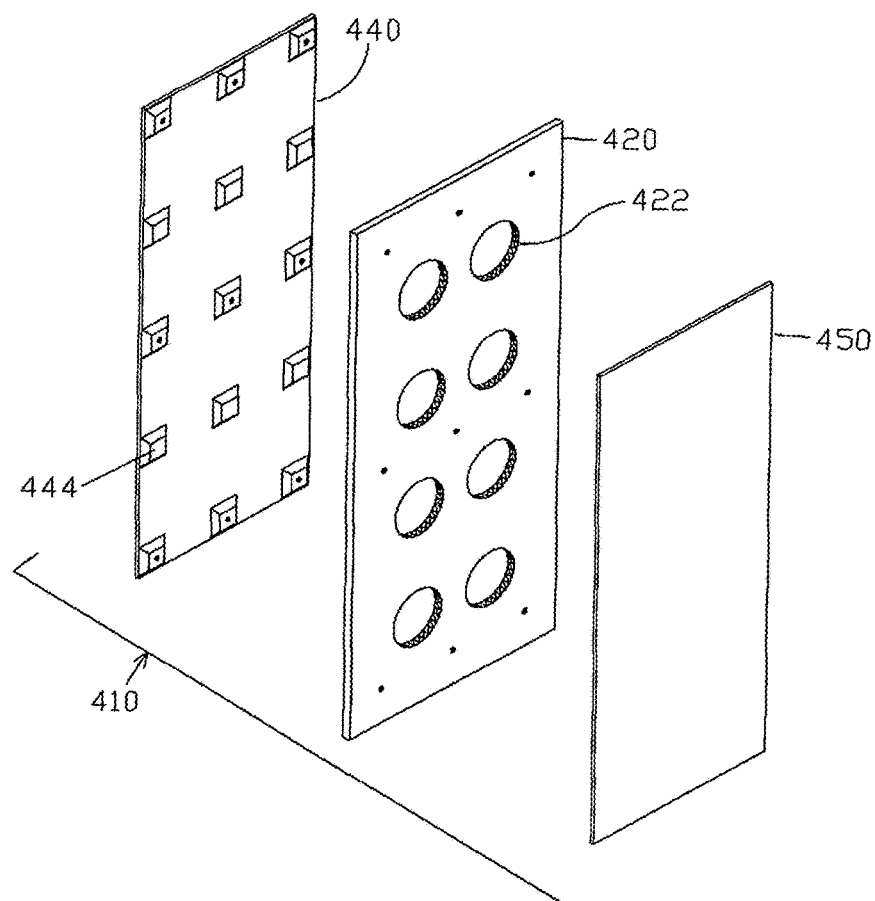
FIG. 8 is an exploded view of a portion of the door 410 of FIG. 7.

FIG. 8 is an exploded perspective view of a portion of the apparatus of FIG. 7. For the following discussion, reference may be made to both FIGS. 7 and 8.

The register 402 provides a flow of air 404 into the closed room 400. The air flow into the room 400 is measured in cubic feet per minute (CFM). To prevent a build up of pressure in the room 400, the flow of air through the door 410 to a return air space 434 outside the room 400 should be proportional to the CFM flow of the inflow air 404. This will be discussed in more detail below on conjunction with the structure of the door 410.

It will be noted that in the doors in this application the terms "inside" and "outside" refer to the room in which the doors are installed. The "inside" refers to the inside of the room 400 and the "outside" refers to the side of the door 410 which faces outwardly from the room and is in contact with the return air space 434.

The door 410 includes an inside door panel or skin 412 comparable to the panel or skin 50 as may be best understood from FIGS. 3-6. The panel or skin 412 is appropriately secured to a top rail 411 and to a horizontal bracing element 413. The top rail 411 is comparable to the top rail 16 of FIG. 5, and the element 413 is broadly comparable to the bracing element 28 of FIG. 5. A single stile 415 is shown in FIG. 7.

The construction of the door 410 is typical of hollow core doors other than the air flow refinements of the air flow elements. Extending through the inside door skin 412 is an opening 414. The opening 414 may be rectangular, or circular, etc. In the opening 414 is an inner panel 440. The configuration of the panel 440 is generally the same as that of the opening 414. The air flow 404 from the register 402 flows through the opening 414 and about the inner panel 440 and into an intake air space 416.

The door 410 also includes an outside door panel or skin 430, comparable to the panel 40, as may best be understood from FIGS. 2 and 6. The door panel or skin (generally "skin" or "skins" hereafter) 430 includes an opening 432 which is generally parallel to the opening 414 and is substantially the same size as the opening 414. Disposed in the opening 432 is an outer panel 450. The outer panel 450 is generally parallel to the inner panel 440 and is substantially the same size.

Between the door skins 412 and 430 is a center panel 420. The center panel 420 includes a plurality of openings 422. Adjacent to the openings 422 on the opposite side of the center panel 420 and between the center panel 420 and the outer panel 440 is an outflow space 424. The outflow space 424 is generally parallel to the intake space 416 and is substantially the same size.

The inner panel 440 includes an outer periphery or rim 442, and the outer panel 540 includes an outer periphery or rim 452. Between the panel 440 and the center panel 420 is a plurality of spacers 444. Between the outer panel 450 and the center panel 420 is a plurality of spacers 454. The spacers 444 and 454 secure the panels 440 and 450, respectively, to opposite sides of the center panel 420, and appropriately space the center panel 420 from the inner and outer panels to define the size of the intake space 416 and the size of the outflow space 424. The spaces 416 and 424 have the same area.

It will be noted that the spacers 444 and 454 are shown in FIG. 7 as being rectangular or circular in configuration, and in FIG. 8 as being truncated pyramidal in configuration. The configuration of the spacers is immaterial; they may be of any desired or convenient configuration.

It will be noted that there are two peripheral spaces shown in FIG. 7 There is a first or inside peripheral space between the opening 414 and the rim or outer periphery 442 of the inner panel 440, and through which the air flow 404 flows into the space 416. There is a second, or outer peripheral space between the opening 432 and the rim or outer periphery 452 of the outer panel 450 through which the air flow 406 flows or passes to the return air space 434.

There is a smooth flow of air 404 from the register 402 through the peripheral space about the rim 442 of the inner panel 440 within the opening 414 into the intake space 416. The air then flows through the opening 422 in the center wall 420 to the outflow space 424 and outwardly through the peripheral space about the rim 452 of the inside panel 450 in the opening 452, and becomes an air outflow 406 to the return air space 434 outside the room 400, thus preventing the build up of air pressure in the room 400.

The peripheral spaces of the inside panel 440 and the outside panel 450 and the size or area of the openings 422 are appropriately dimensioned to provide at least the same or greater area than the peripheral spaces. The air flow 404 thus has no constraints to flowing non-linearly through the door 410 and outwardly from the room 400 into an air return space 434 outside the room 400.

Thus there is no build up of pressure within the room 400. That is, the air flow out of the room 400 through the door 410 is proportional to the CFM of the flow of air through the register 402 into the room 400. The door 410 thus prevents the build up of pressure in the room 400.

The areas through which the air flows must provide an area proportional to the CFM of the inflow of air through the register 402. There is a relationship between the CFM of the inflow 404 and the square inches of the areas through which the air flows. For example, for a 90 CFM inflow 404, there should be an area of about 90 square inches through which the air flows through the peripheral space between the opening 416 and the rim 442 into the space 416, and there should be at least the same 90 square inches in the openings 422 for the flow of air from the space 416 into the space 424. There also should be the same 90 square inches for the air flow 406 through the peripheral space between the opening 432 and the rim 542.

The distances between the outer periphery or rim 442 and the opening 414, and between the outer periphery or rim 452 and the opening 432, are substantially the same. Those distances, and the length of the spacers 444 and 454, are dimensioned so as to provide the same CFM through the door 410 as the CFM through the register 402 of the air flow 404. That is, the spacing between the rim 452 and the opening 432 defines a peripheral space to provide the desired area for the desired air flow, and is thus equal to the peripheral space between the opening 414 and the rim 442 of the panel 440.

The square inches discussed above are the minimum areas for the CFM of the air flow through the register 402 into the room 400 and through the door 410 for the out flow 406 into the receiving space 434 to prevent any increase in the air pressure in the room 400. However, the square inches may be larger if the door permits. On the other hand, depending primarily on the thickness of the door, providing the necessary square inches for the air travel through the door may require additional elements, such as slanted panels into the air spaces 416 and 424. This will be discussed below.

In terms of pressure, professional standards, such as Energy Star Certified Homes, and the DOE's Zero Energy Ready Home Program, generally consider that the pressure in a closed room should be less than 3 pascals, or about 0.012 inches of a water column. For larger rooms, the pressure rises to equal to or less than 5 pascals. The present invention meets those criteria.

In FIG. 7, the panel 440 is shown disposed in the opening 414, and the panel 450 is shown disposed in the opening 432. However, it will be understood that the panels 440 and 450 will be spaced apart from their respective skins 412 and 430 in or adjacent to the openings 414 and 432, respectively, to provide the necessary peripheral spacing relative to the intake spaces 416 and 424, respectively, to provide the desired air flow.

For example, for a relatively strong air flow, in terms of CFM, and a relatively narrow door, the spacing of the panels may be outwardly from the door skins to provide the required peripheral spacing, or in a relatively weak air flow, and a relatively thick door, the panels may be disposed inwardly from the door skins. Thus, the term "adjacent" may be used to define the relationship between the door skins and their openings and the locations of the panels relative to the openings in the door skins. The term "adjacent" accordingly denotes the positioning of a panel relative to the openings in the skins in, inside, or outside, the openings.

In FIG. 8, a plurality of openings 414 are shown in the center panel 420. The total area of the openings 414 is equal to or greater than the area in square inches as discussed above.

FIG. 9 is a fragmentary view, partially broken away, of a door 620 which combines the air scrubbing capabilities of the embodiments of FIGS. 1-6 with the air pressure build up prevention by non-linear air flow capabilities of the door 410 of FIGS. 7 and 8. FIG. 10 is a fragmentary edge view in partial section of a portion of the door apparatus of FIG. 9.

The door 620 includes a stile 622 and a rail 626. The door 620 is shown with an outside skin 628. A portion of the outside skin 628 is broken away to show details of the stile 622.

The stile 622 is split to provide an air passage into the hollow core interior of the door 620. As may be understood best from FIG. 10, the stile 622 is split and the two portions are spaced apart by a plurality of dowels 632 and includes a passageway 624 vertically through the stile. A passageway 624 between the two portions of the stile allows air to flow laterally through the stile into the hollow core portions of the door. Scrubbing elements for removing noxious material, as discussed above for the embodiments of FIGS. 1-6, may remove the noxious material from the air flow.

Similarly, the rail 626 may also be split as shown in FIG. 10 by substituting the reference numeral 626 for the reference numeral 622 in FIG. 10. The rail 626 uses dowels 632 to space apart the two portions of the rail. With split stiles and rails about the perimeter of the door, including reinforcing rails between the top and bottom rails, and holes through the bottom rail, as shown and discussed above in conjunction with the embodiments of FIGS. 1-8, and with the scrubbing material also discussed therewith, air flow through the door 620 performs air scrubbing functions, as well as preventing the build up of air pressure in a closed room when appropriate elements, such as the apparatus 410, are installed in the door.

The pressure of the flow of air into a room, such as the flow 404 of the room 400 of FIG. 7, will provide an air flow through the door 620 to a return air space and also through the stiles and rails for a scrubbing action. Air will thus flow through the door to prevent the build up of pressure and through the stiles and rails to the interior hollow core for the air flow to be scrubbed of noxious materials.

The doors 410 and 620 comprise first generation hollow core doors for preventing pressure buildup in a room, a hollow core door 650 comprises a second generation door, and a first generation "smart door." The door 650 includes privacy provisions and the ability to control the flow of air through the door incrementally from full flow to non-flow, along with the ability to control various programmable electronic devices in a room or structure. Moreover, the door 650 provides a degree of fire retardant capability that provides time for room or house evacuation not provided by standard or contemporary interior hollow core doors, as will be explained below.

FIG. 11 comprises a schematic fragmentary perspective view, partially broken away, of the hollow core door 650. The hollow core door 650 includes a top rail 652 secured to a stile 654. The top rail 652 and a bottom rail, not shown, the stile 654, and another stile, also not shown, comprise a conventional frame for the hollow core door 650.

The door 650 includes an inside skin 660 and an outside skin 720, both of which are shown secured to the top rail 652 and to the stile 654. The outside skin 720 includes an opening 712. The opening 712 includes an inner periphery 714. An outside panel or privacy panel 720 is disposed in the opening 712. The panel 720 includes an outer periphery 722 which is disposed in the opening 712. A peripheral space 718 is defined between the outer periphery of the panel 720 and the inner periphery 714 of the opening 712.

Within the hollow core door 650 is a pair of fixed panels 680 and 700, both of which are secured to the stile 654. A sliding panel 690 is disposed and movable between the fixed panels 680 and 700.

An actuator 730 is appropriately secured to the slidable panel 690. The actuator 730 is shown disposed within the stile 654. A sensor 740 is also disposed within the stile 654. The sensor 740 senses predetermined or desired information from the air adjacent to the door 650. Such information may include temperature, pressure, smoke particles indicative of a fire, carbon monoxide, relative humidity, or other *desiderata*. The sensor may provide and transmit signals in response to the desired sensed information. Signal outputs from the sensor may be sensed by the actuator 730 and by other electronic elements in the room or structure in which the door 650 is installed.

An output signal from the sensor 740 may result in the actuator 730 moving the slidable panel 690. Such movement may be sequential and incremental or full, as described below. Other signals may turn on or off lights, adjust blinds, etc., such as are now provided by smart phones and other electronic devices. Essentially the door 650, with the sensor 740, becomes an intelligence center for the room or structure in which the door is installed, with the ability to provide desired output signals to a wide variety of programmable electronic devices.

Figure 12:
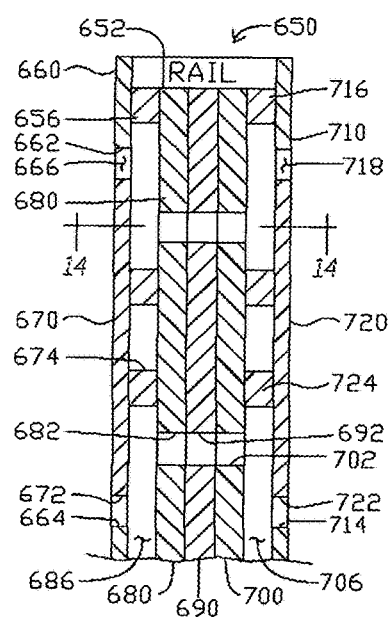
FIG. 12 is a schematic view in partial section taken generally along line 12/13-12/13 of FIG. 11.
Figure 13:
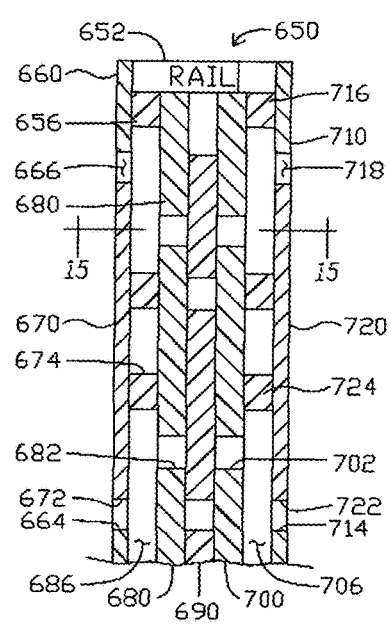
FIG. 13 is a schematic view in partial section sequentially following FIG. 12 also taken generally along line 12/13-12/13 of FIG. 11.

FIGS. 12 and 13 are schematic views in partial section taken generally along lines 12/13-12/13 of FIG. 11 through the door 650. FIG. 13 follows sequentially after FIG. 12. FIGS. 12 and 13 illustrate the movement of the sliding panel 690 relative to the fixed panels 680 and 700.

For the following discussion, reference may be made particularly to FIGS. 12 and 13, but also to FIG. 11. Note that movement of the sliding panel 690 is into and out of the pages for the FIGS. 12 and 13.

Spacer blocks 656 and 716 separate the skins 660 and 710 from the fixed panels 680 and 700, respectively.

The inside skin 660 includes an opening 662, and the opening 662 has an inner periphery 664. Within the opening 662 is an inside panel or privacy panel 670. The panel 670 has an outer periphery 672. A peripheral space 666 is formed between the inner periphery 664 of the skin 660 and the outer periphery 672 of the privacy panel 670.

The panel 670 is spaced apart from the fixed panel 680 by a plurality of spacers 674. An interior space 686 is defined between the fixed panel 680 and the skin 660 and its privacy panel 670. Air flows into the space 686 through the peripheral space 666. Note that the thickness of the spacer block 656 is the same as the length of the spacers 674.

The fixed panel 680 includes a plurality of openings. Air flow from the space 686 is through the openings 682.

The movable or slidable panel 690 is disposed between the fixed panels 680 and 700. The panel 690 includes a plurality of spaced apart openings 692. The openings 692 are shown aligned with the openings 682 of the fixed panel 680 in FIG. 14.

The fixed panel 700 includes a plurality of spaced apart openings 702. The openings 702 are shown aligned with the openings 682 of the fixed panel 680.

As stated above, the outside skin 710 includes an opening 712, and the opening 712 includes an inner periphery 714. The privacy or outside panel 720 is disposed in the opening 712, and has an outer periphery 722. A peripheral space 718 is defined between the inner periphery 714 of the outside skin 710 and the outer periphery 722 of the privacy panel 720. The panel 720 includes a plurality of spacers 724 to space apart the panel 720 from the fixed panel 700.

The outside or privacy panel 710 is spaced apart from the fixed panel 700 by a spacer block 716. The spacer block 716 has the same thickness as the spacers 724 of the panel 720. The spacer blocks 656 and 716 have the same thickness, and the spacers 674 and 724 also have the same thickness or length.

Figure 24:
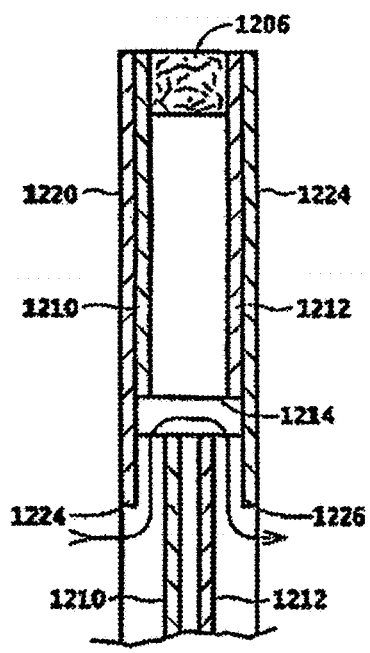
FIG. 24 is a view in partial section taken generally along line 24-24 of FIG. 22.

A chamber 706 is defined by the fixed panel 700 and the skin 710 and its privacy panel 720. Air flows from the chamber 706 outwardly through the peripheral space 718. When the openings 682, 692, and 702 are aligned, as shown in FIG. 24, air flows from the chamber 686 into the chamber 706.

The combined areas of the openings 682, the combined areas of the openings 692, and the combined areas of the openings 702 are equal to each other.

The openings 662 and 712 (see FIGS. 11 and 12) are the same size. The size or area of the panels 670 and 720 are also the equal to each other, and accordingly the peripheral spaces 666 and 718 have the same areas. Therefore, the same amount of air will flow into the chamber 686 as may flow through the aligned openings in the fixed and sliding panels and out of the chamber 706. As with the doors of FIGS. 7-10, the respective areas provide proportional areas for the airflow through a register into a room and out of the room through the door 650 to prevent the build up of pressure in the room.

Figure 14:
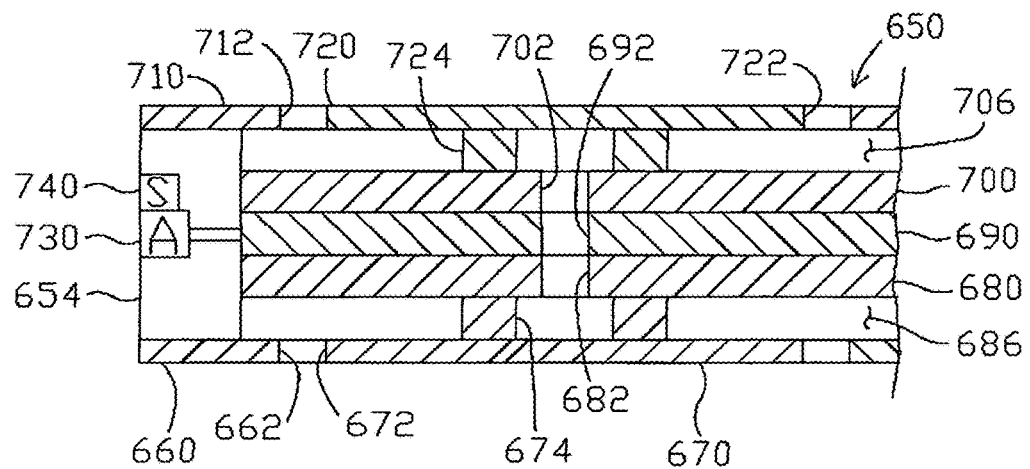
FIG. 14 is a view of the door apparatus of FIG. 11 taken generally along line 14-14 of FIG. 12.
Figure 15:
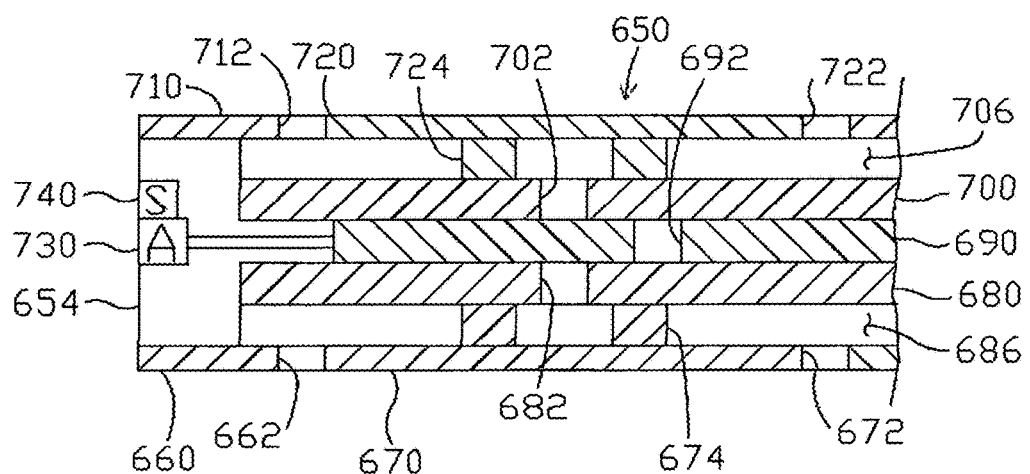
FIG. 15 is a view of the apparatus of FIG. 11 taken generally along line 15-15 of FIG. 13

When the openings 682 and 702 are blocked by movement of the sliding panel 690, as shown in FIG. 15, there is no flow of air between the chambers 686 and 702. The panel 690 is moved by the actuator 730, as shown in FIGS. 14 and 15.

FIGS. 14 and 15 are schematic views in partial section taken respectively along lines 14-14 and 15-15 of FIGS. 12 and 13. FIGS. 14 and 15 show sequentially the movement of the sliding panel 690 from aligning the openings 682, 692, and 702 to allow for the flow of air through the fixed and slidable panels between the chambers 686 and 706 and to the complete blocking of the air flow by a complete misalignment of the openings 682 and 712 in the fixed panels 680 and 700, respectively, by movement of the sliding panel 690, as shown in FIGS. 13 and 15.

There is airflow shown in FIG. 14, and there is no airflow shown in FIG. 15. Airflow is allowed by the alignment of the openings 682, 692, and 702 shown in FIG. 14, and airflow is blocked by moving the panel 690 so that the opening 692 is out of alignment with the openings 682 and 702 in FIG. 15. Note that airflow in and through the door 650 is non-linear, as with the doors 410 and 620, discussed above.

The actuator 730 moves the slidable panel 690 in response to a signal from the sensor 740 or from manual signal from a user or occupant of the room in which the door 650 is installed. There is no significant flow of air through the door 650 when the openings 692 are out of alignment with the openings 682 and 702. With a programmable sensor 740, the movement of the panel 690 may be set to incrementally move the panel 690 in response to a temperature change, or other criteria, to a full closing or misalignment of the openings as shown in FIGS. 13 and 15, as desired, or to a full opening by a full alignment of the openings as shown in FIGS. 12 and 14.

A full closure or non-movement of air through the door 650 by complete non-alignment or blockage of alignment of the openings in the fixed and movable panels as shown in FIGS. 13 and 15, may also be obtained by the sensing of a fire by the sensor 740. Such full closure or blockage provides three panels on the interior of the hollow core door 650. The additional fire resistance may provide additional time for occupants to evacuate the structure in which the door/doors is/are installed. The full non-alignment of the openings in the panels 680, 690, and 700 may also restrict the availability of air or oxygen to a fire in the room.

As stated above, the programmable functions available in contemporary electronics make the door 650 a "smart door" with many capabilities. The location of the sensor 740 in a stile at an appropriate height allows the sensing of information whether the door 750 is open or closed, or anywhere in between, and the sensing is to a more accurate degree than that of a fixed sensor on a wall or on a ceiling. Thus, a plurality of "smart doors" in a structure provides more accurate and more complete information relative to individual rooms and halls than contemporary fixed wall or ceiling sensors may provide.

However, it will be noted that a sensor need not be installed as shown. If desired, a sensor may be installed in any desired of appropriate location in a room, such as wall mounted sensor/transmitter 403 shown in FIG. 7. Nevertheless, the advantages of the sensor installed in the door appear to be preferable to a wall or ceiling installation.

Another advantage or benefit of being able to prevent air flow through a door is when there is a need to limit contact with an individual with a medical problem transmissible by close contact through air flow, such as colds, flu, etc. The person with such medical problem may be isolated in a limited manner by preventing air flowing from the room as provided above. Opening a window in the room may provide sufficient fresh air, and an open window may help evacuate contaminated air from the room.

Figure 16:
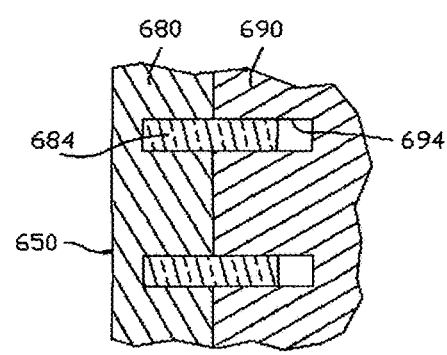
FIG. 16 is a fragmentary view of a portion of the door 650 apparatus of FIG. 11.

FIG. 16 is a fragmentary view in partial section of a portion of the door 650 illustrating the support for the sliding panel 690 on the fixed panel 680. The fixed panel 680 includes a plurality of spaced apart guide blocks 684. The slidable panel 690 includes a plurality of slots 694 which receive the guide blocks 684. The sliding or movable panel 690 is thus supported by and is movable on the guide blocks 684 of the fixed panel 680.

The full pressure build up prevention capabilities of the embodiments of FIGS. 7-16, and the scavenging or scrubbing properties of the embodiments of FIGS. 1-6, may be included in the embodiment of the "smart door" of FIGS. 11-16, thus providing multiple capabilities and benefits.

Figure 17:
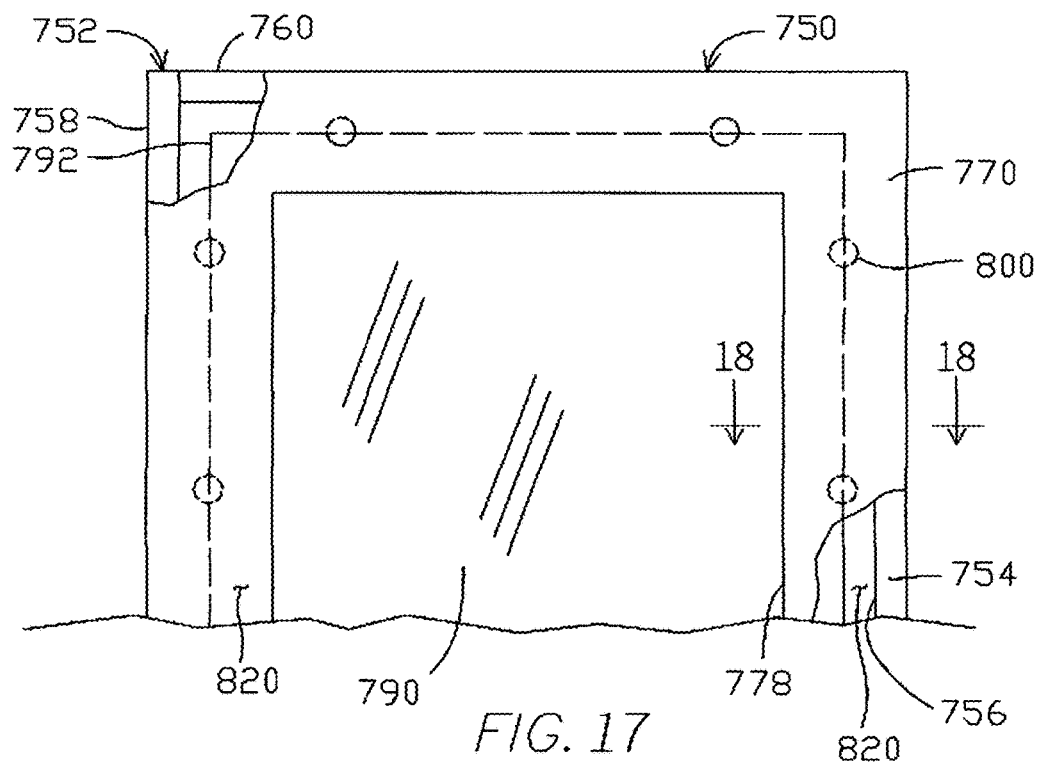
FIG. 17 is a fragmentary front view, partially broken away, of an alternate embodiment hollow core door 750 of the present invention.
Figure 18:
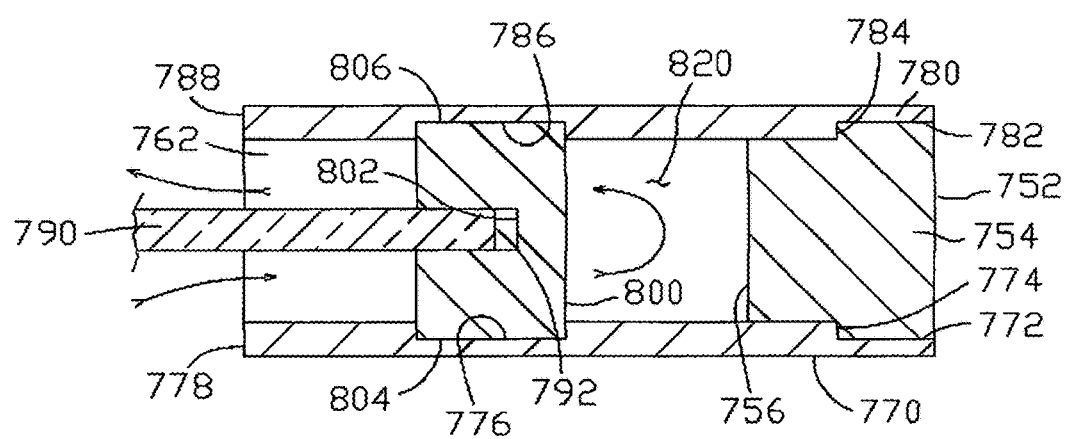
FIG. 18 is an enlarged schematic view in partial section taken generally along line 18-18 of FIG. 17.
Figure 19:
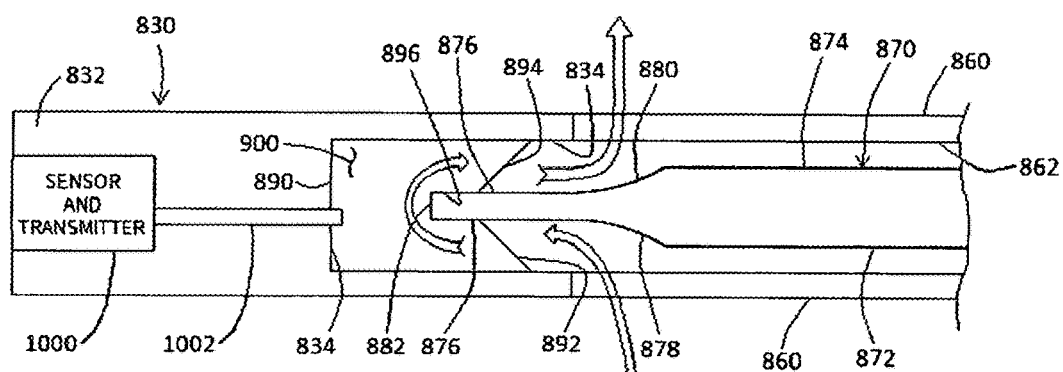
FIG. 19 is a schematic view of a portion of a prior art stile and rail door having a perimeter air flow.

The non-linear flow of air may be provided in another embodiment, a third generation hollow core door 750, illustrated in FIGS. 17 and 18. There is less privacy with the door 750, but there may be greater air flow through the door 750.

FIG. 17 is a partial front or plan view of a portion of the hollow core door 750 having a non-linear flow of air through the door. Portions of the door 750 are broken away to shown structural and other features of the door. FIG. 18 is a view in partial section of a portion of the door 750 taken generally along line 18-18 of FIG. 17. The door 750 includes a fixed center panel disposed between the inside and outside skins.

For the following discussion of the door 750, reference may be made to both FIGS. 17 and 18.

It will be noted that the terms "inside" and "outside" are used with respect to the door 750 as set forth above with respect to the doors 410, 620, and 650.

The door 750 includes a conventional hollow core door perimeter frame 752, including a pair of stiles 754 and 758 and a pair of rails 760 and 762 appropriately secured together. The stile 754 has an end face 756, shown in FIG. 18.

An inside skin 770 is secured to the frame 752. The inside skin 770 includes a rabbet 772 and a shoulder 774 at the end of the rabbet 772. A mating shoulder of the stile 754 is disposed against the shoulder 774. The inside skin 770 also includes a recess or bore 776, and an opening 778. The opening 778 frames a fixed center panel 790. The opening 778 is shown as rectangular in FIG. 17, but may be any desired configuration to conform to a panel which is generally centered or framed by the opening 778. The opening 778, as best may be understood from FIG. 17, defines an inner periphery for framing the panel 790.

The panel 790 is illustrated as being generally rectangular as indicated by the solid and dotted line in FIG. 17. The panel 790 includes an outer periphery 792. The opening 778, or its inner periphery, is smaller than the outer periphery 792 of the panel 790. The area between the inner periphery of the opening 778, and of a like opening 788 in an outside skin 780, and the outer periphery 792 of the panel 790, defines a perimeter portion of the door 750 where the panel is secured to the inside and outside skins, as discussed below and as shown in FIG. 18.

The outside skin 780 includes a rabbet 782 with a shoulder 784 against which a mating shoulder of the stile 754 is disposed. The outside skin 780 also includes a recess or bore 786 aligned with the bore 766 of the inside skin 770. The opening 788 is aligned with the opening 778 of the inside skin 770. The recesses or bores 776 and 786 are also aligned with each other.

The inside skin 770 and the outside skin 780 are mirror images of each other, and they frame the panel 790. The panel 790 is disposed between and spaced apart from the two skins.

The center panel 790 is secured to the inside and outside skins 770 and 780, respectively, by spaced apart support blocks 800. In FIG. 17, the support blocks 800 are shown in dotted line spaced apart for supporting the panel 790. The recesses 766 and 786 in the skins 760 and 780 receive the support blocks 800. As may be understood from FIG. 17, there are a plurality of spaced apart and aligned recesses or bores 776, 786 for receiving a plurality of support blocks 800.

The support blocks 800 include recesses or slots 802. The recesses or slots 802 extend inwardly from the support blocks 800 and receive the outer periphery 792 of the panel 790 to secure the panel between the inside and outside skins. The recesses 802 of the support blocks 800 secure the panel 790 to the support blocks 800, and the support blocks 800 hold the panel 790 a predetermined distance or spacing from the skins 770 and 780.

The support blocks 800 extend outwardly from their recesses in the skins so as to provide a space for air flow between the panel 790 and the adjacent skins. This is clearly shown in FIG. 18. The support blocks 800 include ends 804 and 806 which extend into the recesses or bores 776 and 786 of the inside and outside skins 770 and 780, respectively.

With the panel 790 secured to and disposed between the skins 760 and 780 by the support blocks 800 and their recesses 802, respectively, and with and the skins 760 and 780 secured to the frame 752, the door 750 is complete.

A chamber 820 is defined between the skins 760 and 780 and the end 756 of the stile 754 and above the bottom rail 762, as shown in FIG. 18. The chamber 820 extends about the outer periphery 792 of the panel 790 and within both stiles and both rails, as may be understood from FIG. 17.

The airflow around the panel 790 is illustrated by the arrows in FIG. 18 into and out of the chamber 820, and thus through the door 750 from a room to the outside of the room, as discussed above for the previous embodiments of the pressure build up prevention doors. The airflow is non-linear, as with the previous embodiments to prevent pressure build up in a room.

With the relatively large peripheral length around the entire perimeter or outer periphery of the center panel 792 for the chamber 820, there is more than adequate area for air flow through the door 750 to prevent pressure build up in a room in which the door 750 is located.

It will be noted, as best understood from FIG. 18, that the thickness of the panel 790 generally controls the air flow into and out of the chamber 820. The thickness of the panel, preferably centered between the inside and outside skins, determines the spacing between the panel and the adjacent interior walls of the respective skins. As indicated, the panel 790 is hatched for glass, and thus is shown as a fixed width. If the panel 790 were to be wood, mdf, etc., it could be tapered in the area of the openings 778 and 788 of the skins, and thus vary the flow of air into and out of the chamber 820 from a predetermined amount based solely on the fixed thickness of the panel.

While the center panel 790 is hatched for transparent material in FIG. 18, it will be understood that any type of material may be used for the panel. The center panel may also have a different configuration than shown, and may be of any appropriate size. Moreover, there may be other ways to secure the center panel to the skins than that shown in FIG. 18.

For construction, an inside skin 770 is first prepared and an outer door frame 752 is placed on the skin. The plurality of support blocks 800 is secured to the center panel 790, and the center panel is then placed on the inside skin with the ends 804 of the support blocks 800 disposed in the recesses 776. The outside skin 780 is then placed on the door frame 752, with the recess or bores 786 of the outside skin receiving the ends 806 of the support blocks to complete the fabrication of the door 750. The several elements are, of course, appropriately secured together during the fabricating or assembly process.

For convenience, and to follow the elements shown in FIG. 18, the terms "inside" and "outside" have been used herein to differentiate the two different sets of support blocks. Actual fabrication, of course, may be as desired with respect to "inside" and "outside," or even a different manufacturing procedure may be used. Moreover, a door may use more than a single panel. For example, a top panel and a bottom panel may be used for esthetic purposes.

As with the other pressure build up prevention doors discussed above, scrubbing elements or materials may be added to the door 750 for the removal of noxious material from the air flow through the door.

FIG. 19 is a schematic view of a portion of a stile and rail door 830 having hollow core stiles and rails for providing perimeter air flow through the door. The door 830 also includes sensor elements for sensing predetermined information from the air flow through the door.

The door 830 includes a panel 870 which includes an inside face 872 and an outside face 874. A tongue or flange 876 extends about the outer perimeter of the panel 870, and extends into support elements 890. The tongue or flange 876 has a reduced thickness relative to the thickness of the panel 870 for matingly engaging the support elements 890, and for providing a relatively smooth air flow about the panel 870.

Disposed within the hollow cores of the stiles and rails are the support elements 890. The support elements 890 are spaced apart about the outer perimeter of the panel 870 for providing appropriate support for the panel 870 within the chambers defined by the hollow cores of the stiles and rails of the door 830.

The support element 890 includes a pair of oppositely inwardly extending inside and outside tapers 892 and 894, respectively. The tapers 892 and 894 extend to a recess 896. The recess 896 terminates in a flat end. The flange 876 of the panel 870 extends into the recess 896, with an end 882 of the tongue or flange 876 disposed against the end of the recess 896. The support elements 890 are appropriately secured within the hollow cores.

The panel 870 includes an inside face 872 and an outside face 874. The panel 870 also includes the tongue or flange 876 extending about the panel 870. The flange 876 includes tapering portions 878 and 880 extending from the faces 872 and 874, respectfully. The tapers 878 and 880 reduce the thickness of the flange 876 relative to the thickness of the panel 870. The flange 876 terminates in the outer end 882 at the outer perimeter of the panel 870.

The flange 876 is disposed within the recesses 896 of the support elements 890, with the end 882 of the panel 870 disposed at the inner ends of the slots 896 of the elements 890. Thus, the spaced apart support elements 890 secure the flange 876 of the panel 870 within the hollow cores of the stiles 832, 840 and rails 850 and 860.

A chamber 900 is defined within the aligned slots or hollow cores of the stiles and rails and about the flange 876. As shown in FIG. 19 by the double lined arrows about the flange 876, air flows along or about the inside face 872 of the panel 870 and into the chamber 900, around the end 882 of the tongue or flange 876, out of the chamber 900, and along or about the outside face 874 of the panel 970 and out of the room in which the door 830 is secured.

The chamber 900, defined by the hollow cores of the stiles and rails into which the air flows through the door 830, to provide the same pressure build up prevention as the air flows through the hollow core door 750, shown in FIGS. 10 and 11, discussed above. The structure is different, but the same function is provided. The air flows from the room, as from the room 400 of FIG. 7, around the outer periphery 876 of the panel 870, into the chamber 900, and from the chamber 900 outwardly from the room as shown by the double arrows.

The room air thus flows through the stile and rail door 830 outwardly from the room to prevent the build up of pressure in the room. The flow of air through the door is non-linear to provide a degree of privacy with respect to both light, sight, and sound. The non-linearity is illustrated by the at least five changes of direction in the flow of air through the door 830, as with the other doors discussed above.

A sensor/transmitter 1000 is shown in the stile 832. The sensor/transmitter 1000 includes a sensor probe 1002 extending into the chamber 900. The sensor may be configured to sense any desirable information, such as temperature, humidity, occupancy, VOCs, smoke particulates, carbon monoxide, radon, etc. The information sensed may be transmitted to appropriate receivers, servos, etc. (not shown). The door 830 thus may also be considered a smart door, such as the door 650.

With sensors in every room, such as a static or fixed sensor/transmitter 403 (see FIG. 7) in one part of a room and another sensor 1002 in a door, and every room in a home thus equipped, and with the sensed information transmitted to a computer, the cloud, or to a smart phone, the status of the air in each room then notes any anomaly. The anomaly is noted and then appropriate action may be taken.

The sensed information pinpoints not only the potential problem, but provides the specific location of the potential problem. For example, sensors showing higher than normal humidity in a bathroom may indicate a problem. The specific bathroom is noted. A high radon reading in one part of a house may indicate a radon leak, and the location of the leak or source is noted. The same situation may occur with VOCs noted in a specific room. These are just a few examples of the possibilities of the apparatus of the door 830 combined with static sensors in a room.

The door 650 may be considered the first generation "smart door," and the door 830 the second generation "smart door," and a door 1010 may be considered the third generation "smart door." The door 1010 is a hollow core door with movable dampers for controlling air flow through the door.

Figure 20:
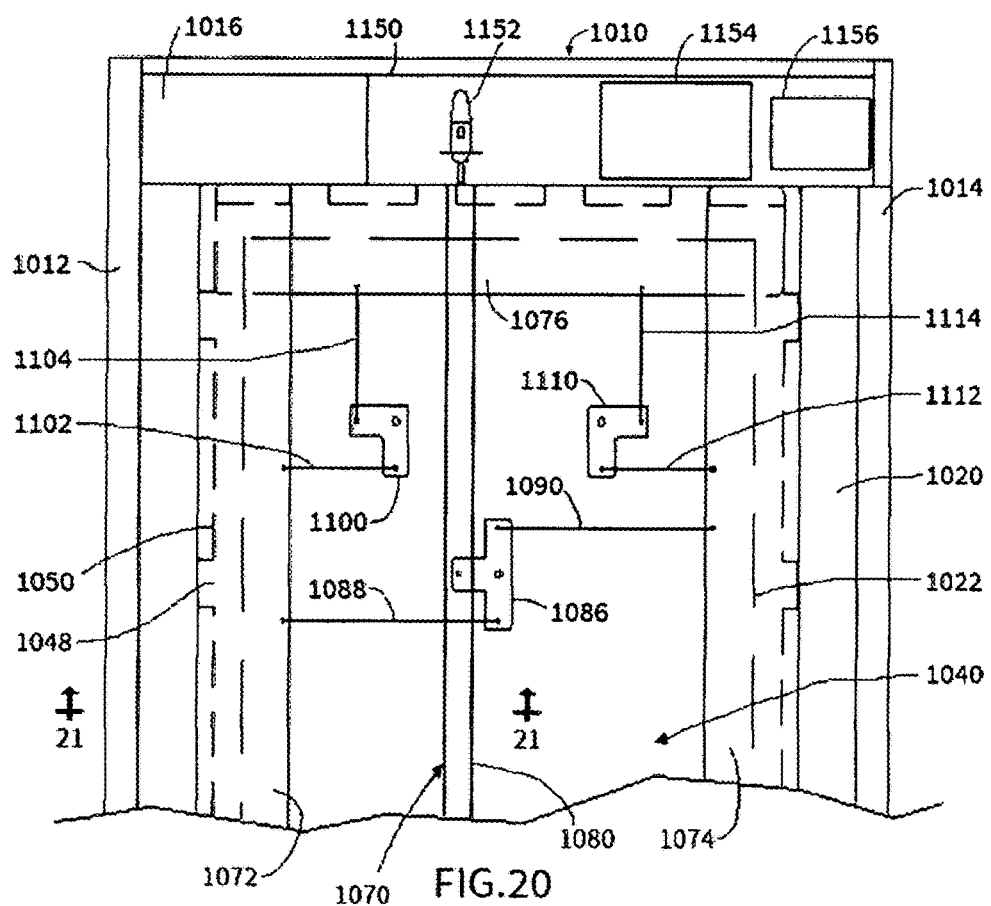
FIG. 20 is plan view, partially broken away, of the upper portion of a prior art hollow core door with movable damper panels for controlling air flow through the door.
Figure 21:
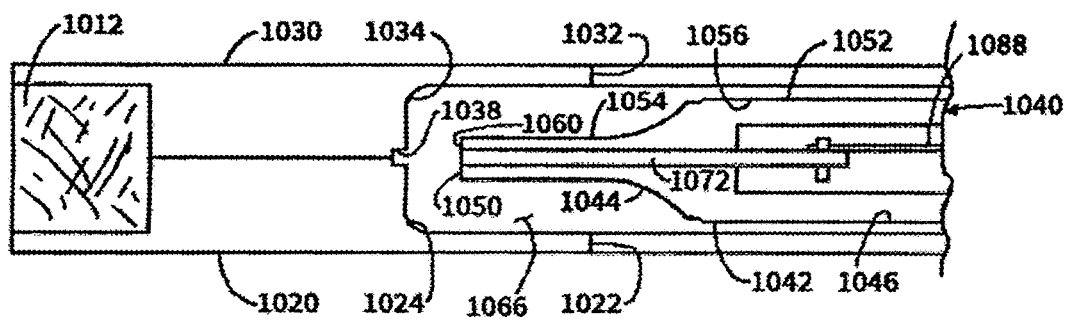
FIG. 21 is a schematic view in partial section and partially broken away illustrating the structural elements and the movable damper panels of the present invention, taken generally along line 21-21 of FIG. 20.

FIG. 20 is a plan view of the hollow core door 1010 with movable damper panels secured to a center panel between inside and outside skins. FIG. 20 comprises the top or upper half of the door 1010. FIG. 21 is a view in partial section and partially broken away illustrating the center panel secured to the inside and outside skins and the movable damper panels secured to the center panel. FIG. 21 is taken generally along line 21-21 of FIG. 20. For the following discussion, reference may be made to FIGS. 20 and 21.

The hollow core door 1010 includes a frame including a stile 1012, a stile 1014 and a top rail 1016. An outside skin 1020 and an inside skin 1030 are secured to the stiles and rails of the conventional or standard hollow core door frame.

The outside skin 1020 includes an opening 1022. The opening 1022 includes a peripheral recess 1024.

The inside skin 1030 includes an opening 1032 and the opening 1032 includes a peripheral recess 1034. As may be understood from FIG. 21, the inside and outside skins 1030 and 1020, respectively, are disposed against each other at the inside of the recesses, the inside of the recesses defining inwardly extending rims for the skins of the door 1010. The recesses 1024 and 1034 extend about the inner peripheries of the respective skins. The skins 1020 and 1030 are mirror images of each other.

At the juncture line of the interior periphery of the skins, as best shown in FIG. 21, is a damper groove 1038 which receives the movable damper panels. The damper groove 1038 extends about the inner periphery at the juncture of the skins. This will be discussed below.

A center panel 1040 is disposed between the skins 1020 and 1030 in the hollow core of the door 1010. The center panel 1040 is comprised of two half panels 1042 and 1052. The half panel 1042 is an outside center panel, and the half panel 1052 is an inside center panel. Facing each other is a recess 1046 and a recess 1056 in the outside center panel 1042 and the inside center panel 1052, respectively.

The outside center panel 1042 includes a tapered outer perimeter 1044. The tapered outer perimeter 1044 includes a plurality of spaced apart tabs 1048. The tabs 1048 are disposed on bosses (not shown) of the outside skin 1020, and are appropriately secured thereto. Between the tabs 1048 are notches 1050. Air flows through the notches 1050 as will be discussed below. The outside and inside skins include the spaced apart bosses (not shown) on which the tabs are disposed and on which they are secured. Both halves of the center panel 1040 include aligned notches. A notch 1050 on the outside half panel 1042 is shown in FIG. 21, and may be understood from FIG. 20.

The inside center panel 1052 includes a tapered outer perimeter 1054. The notches 1050 are spaced apart between the tabs 1058. Air flows through the aligned notches 1050 and 1060 on the center panel 1040. The outer perimeter of the panel halves, and thus of the panel 1040, is greater than the inner peripheries of the openings in the skins, resulting in a non-linear air flow through the door 1010.

Within the recesses 1042 and 1052 is a damper panel assembly 1070. The damper panel assembly 1070 is appropriately secured to the outside center panel 1042. The damper assembly 1070 includes a side damper panel 1072, a side damper panel 1074, a top damper panel 1076, and a bottom damper panel (not shown). The damper panels 1072, 1074, and 1076 are shown in their closed position in FIG. 20, blocking the flow of air through the aligned notches 1050 and 1060.

The damper panel 1072 is shown in its open position in FIG. 21, allowing air to flow through the aligned notches and through the door 1010. The flow of air may be understood from FIG. 21 to be non-linear.

In FIG. 20, the movement of the damper panels is accomplished by the damper panel assembly 10 70. An actuator bar 1080 is movable vertically on the panel, and is biased in its upper position by a tension spring or springs (not shown) to keep the damper panels in their closed position, as shown in FIG. 20.

Downward movement of the actuator bar 1080 moves the damper panels to their open position, as shown in FIG. 21. The damper panels are connected to the bar 1080 through actuator plates or bell cranks and rods.

An upper actuator plate or bell crank 1086 is secured to the bar 1080 for pivoting movement. The bell crank 1086 is a T-shaped bell crank which pivots on the bar 1080 in response to vertical movement of the bar 1080. In turn, the bell crank 1086 is pivotly secured to the outside center panel 1042. The bottom of the tee is secured to the bar 1080, while the center of the arms is pivotly secured to the panel 1040. The arms of the bell crank 1086 are pivotly secured to the damper panel 1072 and to the damper panel 1074 by rods 1088 and 1090, respectively.

Rods 1094 and 1096 are pivotly secured to the arms of a bell crank 1092. As the bar 1080 moves downwardly, the bell cranks 1086 and 1092 pivot counterclockwise and draw their respective rods inwardly, thus moving the side plates 1072 and 1074 inwardly to uncover the notches 1050 and 1060 to allow air flow through them, as shown in FIG. 21.

Thus vertical movement of the bar 1080 results in the joint inwardly and outwardly movement of the damper panels to control air flow through the aligned notches 1050 and 1060 of the two halves 1042 and 1052 of the center panel 1040, respectively.

The top and bottom damper panels respectively, move jointly with the side damper panels by means of angle arms secured to the side panels and to the outside center panel 1040.

The top damper panel 1076 moves by an angle plate 1100 and an angle plate 1110, both of which are secured for pivoting on the outside center panel 1042 at the juncture of the angle arms. The plate 1100 is pivotly secured to the side damper plate 1072 by a rod 1102 and to the top damper plate by a rod 1104. The rods 1102 and 1104 are secured to the plate 1100 at the outer ends, respectively, of the bottom and top of the arms of the angle plate 1100.

The angle plate 1110 is pivotly secured to the outside center panel 1042 at the juncture of its arms, and to the top damper plate 1076 by a rod 1110 and to the side damper plate 1020 by a rod 1112. The rods 1110 and 1112 are secured to the arms of the plate 1110 at the outer ends of the top and bottom arms, respectively.

As the side damper panels 1072 and 1074 move inwardly by the upward movement of the bar 1080, the respective angle plates pivot to move the top and bottom damper plates outwardly to block air flow through the aligned notches 1050 and 1060. As the bar 1080 moves downwardly to move the side damper panels inwardly, the angle plates pivot to move the top and bottom plates to move inwardly to allow air movement through the notches 1050. The movement of the damper plates is jointly or simultaneously to control the flow of air through the aligned notches 1050 and 1060 through the center panel 1040.

Movement of the bar 1080 is controlled by an actuator 1152. The actuator 1152 is disposed in a removable housing or tray 1150 located in the top rail 1016. Also disposed in the housing 1150 is a sensor package 1154, with a plurality of sensors and transmitters and a microprocessor computer, and an appropriate power source, such as a battery pack 1156, for providing power for the actuator 1152 and the sensor package 1154. It will be noted that any appropriate power transfer device may be used to move the damper panels.

Under microprocessor computer control, the bar 1080 may be moved incrementally to control the flow of air through the door 1010. With a number of such doors in a dwelling, the air flow through the doors may be closely matched to the requirements for the precise balancing of air flow throughout a dwelling for maximum efficiency of a forced air system regardless of temperature, wind, or other factors. Sensors for sensing air flow, temperature, humidity, smoke or other particulates, or any other desired elements or quantities, as discussed previously, may be considered when programming microprocessors for the control of air through a pluralities of doors in a dwelling.

A microprocessor computer may correlate the sensed information transmitted by a plurality of sensors in the plurality of doors and transmit signals to control the flow of air through a plurality of doors to prevent the pressure build up in the rooms in which the doors are installed, and thus maintain the desired pressure in each room at or below the recommended three pascals, as set forth above.

Moreover, with the technology of smart phones and appropriate apps, the information as to pressure or any other desired data may be transmitted and signals may be transmitted for remotely controlling air flow. The incremental adjustment of the damper panels allows precise control of air flow through a plurality of doors in a dwelling or other structure according to predetermined parameters or by selective remote control through smart phone technology.

As best shown in FIG. 21, a chamber 1066 is defined within the peripheral recesses 1024 and 1034 of the outside and inside skins, respectively, into and out of which chamber the air flows. The chamber 1066 extends fully about the center panel 1040. The outer portion of the panel 1072 extends into the chamber 1066. The damper panels, such as the panels 1072, 1074, and panel 1076 shown in FIG. 20, control the flow of air around or about the perimeter of the panel 1072 and thus through the door 1010 in a non-linear manner of a least five changes of direction in the air flow.

The size and number of the notches may be varied to provide the necessary air flow. It is the air flow that is important, not the number of notches. Moreover, while the above discussion refers to structures with a forced air system, the present invention applies to the prevention of pressure buildup regardless of the source of airflow into a room, such as a forced air system shown in FIG. 7 or an open window (not shown).

Figure 22:
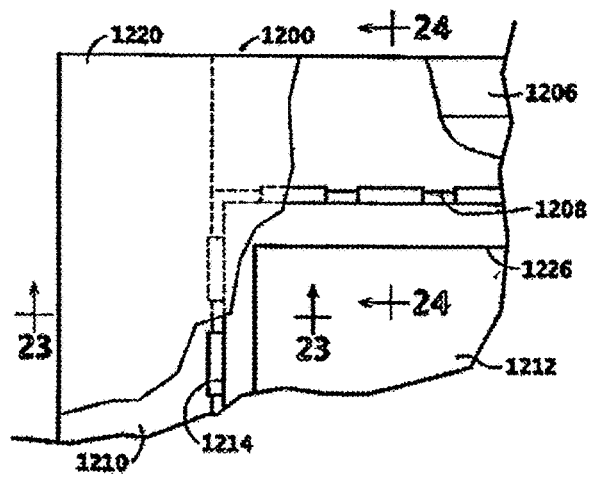
FIG. 22 is a plan view, partially broken away, of a hollow core door embodiment of the present invention.
Figure 23:
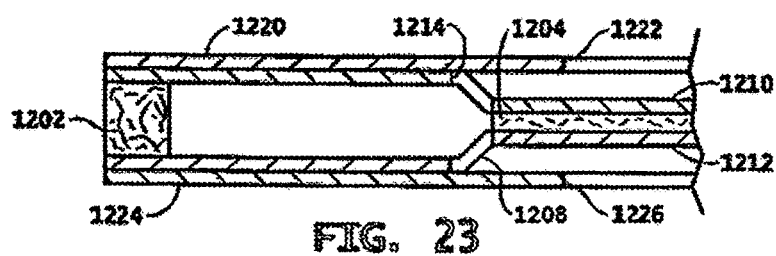
FIG. 23 is a view in partial section taken generally along line 23-23 of FIG. 22.

FIG. 22 is a plan view, partially broken away, of a hollow core door embodiment 1200 of the present invention. FIG. 23 is a view in partial section taken generally along line 23-23 of FIG. 2. FIG. 24 is a view in partial section taken generally along line 24-24 of FIG. 22. For the following discussion, reference will be made primarily to FIGS. 22, 23, and 24.

The door 1200 has a conventional hollow core door frame including a pair of stiles, of which a stile 1202 is shown in FIG. 23, and a pair of rails, of which a top rail 1206 is best shown in FIG. 24. The stiles and rails are appropriately secured together.

A center element comprising a pair of molded skins is secured to the stile and rail frame. The skins include an inside skin 1210 and an outside skin 1212. Filler material 1204 is shown disposed between the skins 1210 and 1212 in FIG. 23. The molded skins 1210 and 1212 include inwardly tapered portions 1208, which are well known and understood in the art.

Spaced apart along the skins adjacent to the frame are holes or openings 1214. The holes or openings 1214 extend through the molded skins adjacent to the tapered portions 1208 of the stiles and rails, respectively. The area or portion of the molded skins at or adjacent to the tapered portions 1208 is defined as the margins of the door 1200.

FIG. 23 shows the stile 1202 and the molded inside and outside skins 1210 and 1212, respectively, adjacent to the opening 1214.

FIG. 24 shows the location of an opening 1214 through the skins 1210 and 1212 and adjacent to the rail 1206 at the margins of the door 1200. See also FIG. 22.

On top of the inside skin 1210 is an outer inside skin or cover 1220. The outer inside skin or cover 1220 includes an opening 1222. The opening 1222 is located laterally inwardly from the openings 1214 through the inside and outside skins 1210 and 1212, respectively.

On top of the outside skin 1212 is an outer outside skin 1224. The outer outside skin 1224 includes an opening 1226. The opening 1226 is adjacent to and spaced apart laterally inwardly from the openings 1214. With the openings 1222 and 1226 spaced apart laterally inwardly from the openings 1214, the flow of air through the door 1200 is non-linear, with at least five changes of direction in the flow of air.

As best shown in FIG. 24, the air flow through the door 1200 is through the opening 1222 in the outer inside skin or frame 1220, through the opening 1214, along the outside skin 1212, and outwardly through the opening 1226 in the outer outside skin 1224. As may be understood by the curved arrow in FIG. 24, the air flow through the door 1200 is non-linear, with at least five changes of direction. This non-linear air flow pattern is also present in the prior art doors discussed above.

The openings 1222 and 1226 are aligned generally parallel to each other. This alignment is shown clearly in FIGS. 23 and 24.

Figure 25:
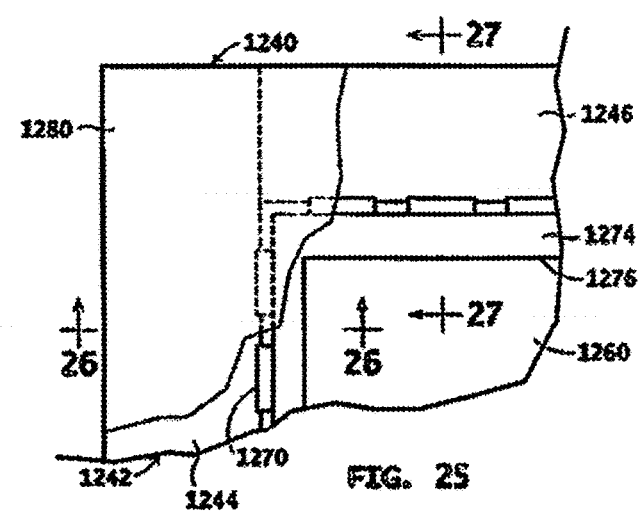
FIG. 25 is a plan view, partially broken away, of a stile and rail door embodiment of the present invention.
Figure 26:
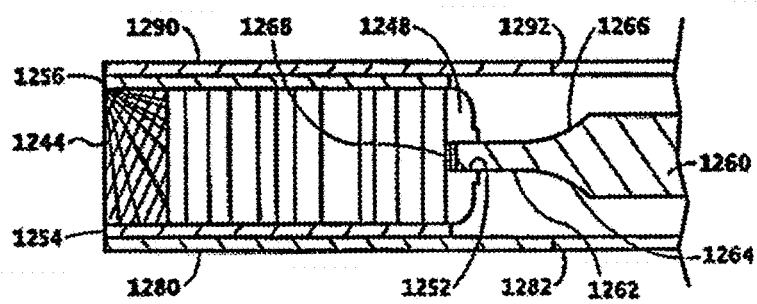
FIG. 26 is a view in partial section taken generally along line 26-26 of FIG. 25.
Figure 27:
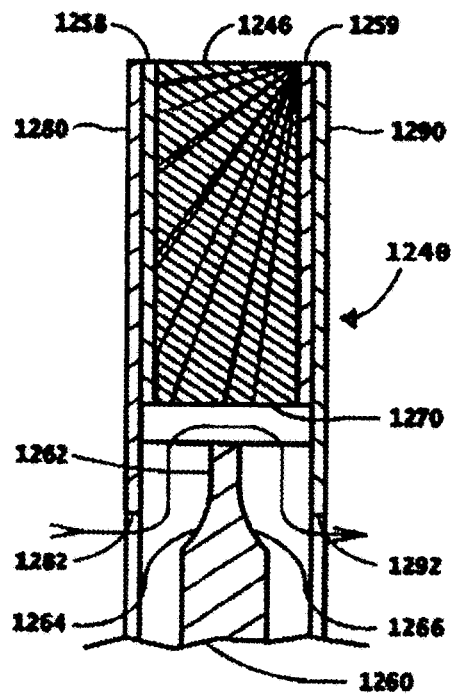
FIG. 27 is a view in partial section taken generally along line 27-27 of FIG. 25.

FIG. 25 is a plan view, partially broken away, of a stile and rail door embodiment 1240 of the present invention. FIG. 26 is a view in partial section through a stile 1244 taken generally along line 26-26 of FIG. 25. FIG. 27 is a view in partial section through a top rail 1246 taken generally along line 27-27 of FIG. 25. For the following discussion, reference may be made to FIGS. 25, 26, and 27.

The door 1240 includes a conventional stile and rail frame 1242, of which a stile 1244 and a top rail 1246 are shown in FIG. 25. The stiles of the frame 1242 are illustrated as engineered stiles, with a solid wood outer element and a plurality of plywood elements secured to the wood element. The purpose of the engineered stiles is to reduce warping of the door. The rails are generally solid wood, since warping is not a problem for the rails. The stiles and rails are appropriately secured together to comprise a frame.

Laminates 1254 and 1256 are shown secured to the stile 1244. Laminates 1258 and 1259 are shown secured to the rail 1246. The laminates cover the stiles and the rails for esthetic purposes.

On the inside perimeter of the stiles and rails of the frame 1242 is a conventional ovolo sticking 1248. The ovolo sticking is best shown in FIG. 26. There is a groove or slot 1252 centered in the ovolo sticking 1248. The groove or slot 1252 receives the outer perimeter of a center element or panel 1260.

The center panel 1260 is secured to the stile and rail frame 1242 in the groove 1252 at a reduced thickness outer perimeter portion 1262. The reduced thickness outer perimeter portion 1262 includes a tapered inside portion 1264 and a tapered outside portion 1266. The reduced thickness outer perimeter portion 1262 terminates in an outer end 1268. The end 1268 and an adjacent part of the reduced thickness outer perimeter portion 1262 extend into the groove or slot 1252 of the sticking 1248 and is appropriately secured therein.

The ovolo sticking 1248 and the adjacent portion of the reduced thickness outer perimeter 1262 define the margin portion of the door 1240, through which extends a plurality of spaced apart openings 1270. That is, the juncture of the sticking and the center panel define the margin of the door 1240.

An inside skin element or cover 1280 is disposed about the stiles and rails of the frame 1242. The inside skin element or cover 1280 includes an opening 1282. The opening 1282 is located laterally inwardly relative to the openings 1270 to provide the non-linear flow of air through the door 1240.

An outside skin element or cover 1290 is disposed about the stiles and rails of the frame 1242 generally parallel to an inside skin or cover 1280. The outside frame or cover 1290 includes an opening 1292 which is aligned generally parallel to the opening 1282 of the skin or cover 1280. This is clearly shown in FIGS. 26 and 27.

In the stile and rail door 1240, the inside and outside skin elements 1280 and 1290 are essentially outer inside and outer outside elements.

The openings 1282 and 1292 are disposed adjacent to and spaced laterally inwardly from the openings 1270 at the margins of the door 1240 to provide a non-linear path for the air flow through the door.

As may be understood from FIG. 27, air flow through the door 1240 flows about the opening 1282 in the skin 1280 and past the tapered portion 1264 of the outer perimeter reduced thickness portion 1262 of the center frame 1260. The air then flows through the openings 1270 and around the reduced thickness portion 1262, past the outside tapered portion 1266. The air then flows outwardly through the opening 1292 of the outside skin or frame 1290. The air flow is in a non-linear manner, as indicated by the arrow in FIG. 27 to help control light, sight, and sound through the door. The non-linear air flow also, as with the previously discussed doors, has at least five changes of direction.

Referring again to FIGS. 22 and 24 and to FIGS. 25 and 27, a margin periphery may be defined by the openings 1214 and 1270 for the doors 1200 and 1240, respectively. That is, with the openings 1214 and 1270 disposed all around the doors 1220 and 1240, the openings 1214 and 1270 define a margin periphery with respect to air flow through the doors. A margin periphery has a margin peripheral length defined by the openings through which air flows into the doors. In other words, the length of a line drawn through the openings in the margins of a double skin door and of a stile and rail door define a margin peripheral lengths.

The length of the inner periphery of an opening in the outer skins of a double skin door, and the length of the inner periphery of an opening of the skins in the stile and rail door, define the a skin opening peripheral lengths.

For any door, a margin peripheral length is greater than a skin opening peripheral length. Accordingly, the air flow through a door is non-linear since the air must flow through the openings in the inside skin, about the center element and outwardly through the opening in the outside skin. This path through the door requires at least five changes of direction in the flow of air.

Figure 28:
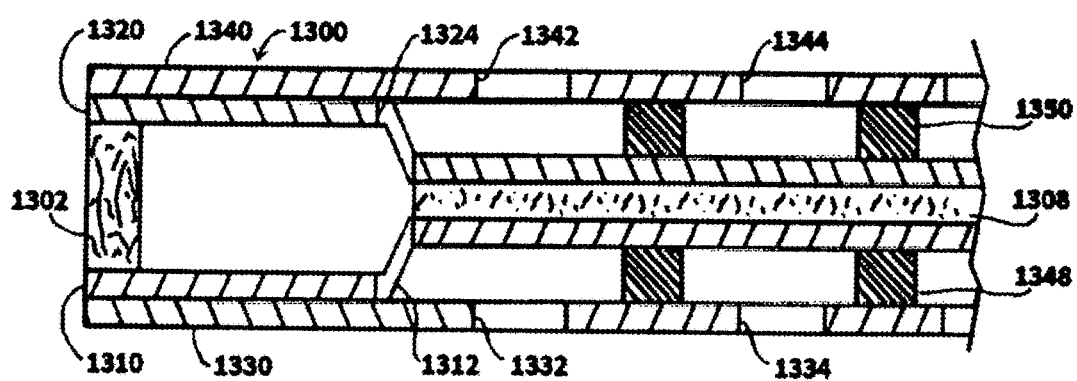
FIG. 28 is a view in partial section of another embodiment of a hollow core door of the present invention.

The general principles of the structure of the doors 1200 and 1240 may be applied to a wide variety of decorative geometric designs in the outer skins or covers. FIG. 28 is a view in partial section through a door 1300, comparable to FIG. 23 for the door 1200. The door 1300 is a hollow core door with openings extending through outer inside and outside skins inwardly of the margins shown in FIGS. 23 and 24. The openings are decorative geometric or pattern openings in the outer inside and outside skins.

The door 1300 includes a conventional stile and rail frame such as discussed above for other hollow core doors discussed above. The door 1300 has a stile 1302 and a molded inside skin 1310 and a molded outside skin 1320. The molded skins 1310 and 1320 include inwardly extending tapered portions 1312, with filler material 1308 disposed between the skins, as discussed above and as is well known and understood in the hollow core door manufacturing art. Openings 1312 extend through the skins 1310 and 1320 at the margins of the door as discussed above for the door 1200.

An outer inside skin or cover 1330 is appropriately secured to the inside skin 1310, and an outer outside skin 1340 is appropriately secured to the outside skin 1320. The outer skins 1330 and 1340 include a decorative design or pattern which includes a plurality of openings, such as openings 1332 and 1334 for the outer skin 1330 and openings 1342 and 1344 for the outer skin 1340.

A plurality of support blocks 1348 and 1350 are shown extending between the inside and outside skins 1310 and 1320, respectively, and the outer skins or covers 1330 and 1340, respectively, for supporting the decorative design or pattern elements.

The spacer blocks 1348 and 1350 are comparable to other spacer blocks discussed above, such as the spacer blocks 444 for the door 410 of FIG. 8, and the spacer blocks 674 and 724 for the door 650 of FIGS. 12 and 13 for providing appropriate support.

The decorative geometric pattern or design is cut into both outer skins or covers and the patterns may be appropriately aligned in parallel. Air flows into the door 1300 through the design openings, such as the openings 1332 and 1334 in the outer inside skin, around the spacer blocks, and through the openings 1312 and outwardly from the door through the pattern openings 1342 and 1344 in the outer outside skin 1340. The air flow through the door 1300 is non-linear, with at least five changes of direction, as discussed for the other doors discussed above.

The design or pattern cut into the outer skins may be virtually any configuration, from something relatively simple such as a circle, an oval, a diamond, or something relatively complicated, such as a tree. The limit is a person's imagination. Fragmentary examples of such designs are shown in FIGS. 29, 30, and 31.

Figure 29:
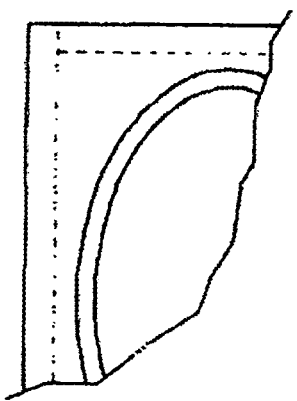
FIGS. 29, 30, and 31 are fragmentary plan views of doors of the present invention illustrating examples of decorative geometric designs for the doors.

FIG. 29 is a fragmentary plan view a simple circle or oval geometric design. The circle, or circles, or ovals, may be located as desired in the outer skins or covers of a door subject to the requirement that air flow through the outer skins is non-linear.

Figure 30:
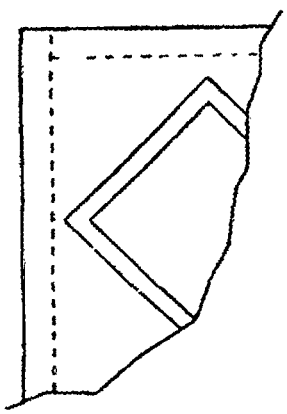

FIG. 30 is a fragmentary plan view of a simple diamond geometric design. The diamond, or diamonds, may be located as desired in the outer skins or covers of a door.

Figure 31:
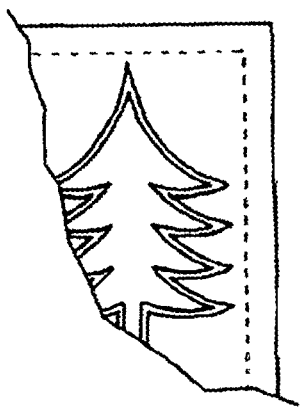

FIG. 31 is a fragmentary view of a more complicated geometric design than the designs of FIGS. 29 and 30. The design shown is a tree design. The tree, or trees, may be located as desired in the outer skins or covers of a door.

Moreover, rather than have the same design on both sides of a door, and generally parallel to each other, different designs may be used in the inside and outside of a door. As with all doors, the air flow desired through the door must be matched to the size of the openings in the inside and outside door elements.

The design principles of the door 1300 and the use of decorative elements in the outer panels or skins with the support elements as shown in FIG. 28, may also be applied to a stile and rail door such as the door 1240, as indicated above. The skins 1280 and 1290 may include decorative designs along with the use of the support blocks as shown in FIG. 28. The decorative design openings, such as shown in FIGS. 29, 30, and 31, or other desired designs, may be cut in the outer skins to provide the desired air flow through the door.

As with the other doors discussed herein, appropriate material may be added to the inside of the door 1010 for removing noxious material from the air flow through the door.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements, without departing from those principles. For example, the cuts through the center elements may be located as desired with respect to the stiles and rails. Moreover, the definition of "margins" may be varied as desired for a particular application for hollow core doors and stile and rail doors. The margins need not be at the inwardly tapering portion of a molded skin of a hollow core door, but may be located at any desired or convenient position. This is especially true for geometric decorative designs. The appended claims are intended to cover and embrace any and all such modifications, within the limits only of the true spirit and scope of the invention.

What I claim is:

1. A door having a stile and rail frame and a center element secured to the stile and rail frame for preventing pressure build up in a closed room comprising in combination:

a pair of stiles spaced apart;

a pair of rails, including a top rail and a bottom rail secured to the spaced apart stiles and defining a door frame;

a center element secured to the door frame;

margins of the door frame and the center element defined as the portions of the door frame and the center element adjacent to where the door frame and the center element overlap;

openings extending through the margins of the door frame and the center element;

an inside skin secured to the door frame and having an opening adjacent to and laterally inwardly from the openings through the margins of the door frame and the center element; and an outside skin secured to the door frame and having an opening adjacent to and laterally spaced apart from the openings through the margins of the door frame and the center element, whereby air flows through the opening in the inside skin, through the openings through the margins and through the opening in the outside skin in a non-linear manner to prevent pressure build up in the closed room.

2. The door of claim 1 in which the door comprises a hollow core door and the center element comprises a first pair of skins secured to the door frame.

3. The door of claim 2 in which the first pair of skins includes a molded inside skin and a molded outside skin and the molded inside and outside skins taper inwardly and the margins of the door frame and the center element are defined at the inward tapers.

4. The door of claim 3 in which the openings in the inside and outside skins extend through the margins at the inward tapers.

5. The door of claim 4 which further includes a second pair of skins, including an outer inside skin and an outer outside skin, and the outer inside skin and the outer outside skin include openings through which air flows to and through the openings in the margins.

6. The door of claim 5 in which the openings in the second pair of skins comprise decorative designs, and further includes support elements for supporting the outer inside skin and the outer outside skin adjacent to the decorative design openings.

7. The door of claim 1 in which the door is a stile and rail door and the center element is a center panel having margins adjacent to the stiles and rails, and the openings extend through the margins of the stiles and rails and the center panel.

8. The door of claim 7 in which the stile and rail door includes laminates secured to the pairs of stiles and rails.

9. The door of claim 8 in which the openings extend through the laminates.

10. The door of claim 1 in which the openings in the inside and outside skins are aligned.

11. The door of claim 1 in which the openings in the inside and outside skins have an inner peripheral length and the door frame and center element have a margin peripheral length which is greater than the inner peripheral length.

12. The door of claim 1 which includes means for removing noxious material from the air flow through the door.

13. The door of claim 1 in which the stiles and rails include
a sticking,
a groove in the sticking; and
the center element includes an outer perimeter extending into the groove in the sticking.

14. The door of claim 13 in which the plurality of openings in the center element extend through the sticking and the outer perimeter of the center element in the sticking.

15. The door of claim 14 in which the margins of the door frame and the center element are defined at the juncture of the sticking and the center element.

16. A door having a stile and rail frame and a center element secured to the stile and rail frame for preventing pressure build up in a closed room comprising in combination:
a pair of stiles spaced apart;
a pair of rails secured to the spaced apart stiles and defining a door frame;
a center element secured to the door frame;
an inside skin secured to the door frame;
an opening extending through the inside skin;
an outside skin secured to the door frame;
an opening extending through the outside skin;
the door frame and the center element having margins defined where the door frame and the center element overlap and openings extending through the margins spaced apart outwardly from the openings in the inside and outside skins whereby air flows non-linearly through the openings in the inside skin, through the margin openings in the center element, and outwardly through the opening in the outside skin.

17. The door of claim 16 in which the stiles and rails include a sticking, and the openings at the margins extend through the sticking.

18. The door of claim 16 in which the stiles and rails include a sticking, and the center element is secured to the door frame at the sticking.

19. The door of claim 18 in which the sticking includes a groove and the center element includes an outer perimeter portion which extends into the groove.

20. The door of claim 16 in which the openings in the inside and outside skins include decorative patterns and support elements for supporting the inside and outside skins adjacent to the decorative pattern openings.

21. The door of claim 16 which further includes means for removing noxious material from the flow of air through the door.

* * * * *